US012592121B2

(12) United States Patent
Asher et al.

(10) Patent No.: US 12,592,121 B2
(45) Date of Patent: Mar. 31, 2026

(54) GAME ACCESS DEVICE WITH PRIVILEGES

(71) Applicant: CFPH, LLC, New York, NY (US)

(72) Inventors: Joseph M. Asher, Las Vegas, NV (US); Ron Rushin, Las Vegas, NV (US); Dean P. Alderucci, Westport, CT (US); Geoffrey M. Gelman, Brooklyn, NY (US)

(73) Assignee: CFPH, LLC, New York, NY (US)

( * ) Notice: Subject to any disclaimer, the term of this patent is extended or adjusted under 35 U.S.C. 154(b) by 0 days.

(21) Appl. No.: 18/527,585

(22) Filed: Dec. 4, 2023

(65) Prior Publication Data

US 2024/0105000 A1     Mar. 28, 2024

Related U.S. Application Data

(63) Continuation of application No. 17/364,943, filed on Jul. 1, 2021, now Pat. No. 11,875,639, which is a
(Continued)

(51) Int. Cl.
| | |
|---|---|
| *A63F 13/00* | (2014.01) |
| *G06K 19/077* | (2006.01) |
| *G07F 17/32* | (2006.01) |

(52) U.S. Cl.
CPC ... *G07F 17/3241* (2013.01); *G06K 19/07762* (2013.01); *G07F 17/32* (2013.01); *G07F 17/3218* (2013.01); *G07F 17/3223* (2013.01); *G07F 17/3239* (2013.01); *G07F 17/3255* (2013.01)

(58) Field of Classification Search
CPC ............ G07F 17/3244; G07F 17/3255; G07F 17/3204
See application file for complete search history.

(56) References Cited

U.S. PATENT DOCUMENTS

| | | | |
|---|---|---|---|
| 6,346,886 | B1 | 2/2002 | De La Huerga |
| 2005/0242962 | A1 | 11/2005 | Lind |

(Continued)

FOREIGN PATENT DOCUMENTS

| | | |
|---|---|---|
| JP | 2002168019 | 6/2002 |
| JP | 2002297726 | 10/2002 |

(Continued)

*Primary Examiner* — David L Lewis
*Assistant Examiner* — Eric M Thomas

(57) ABSTRACT

Systems and methods for verifying the eligibility of players attempting to participate in gaming events are disclosed. Communication objects having RFID tags and closed electrical circuits are individually assigned to and worn by players within a gaming player verification system. These RFID tags may communicate with associated player tracking units attached to gaming machines and other devices via radio frequency waves, and each communication object may alter its communication pattern in response to any break of its closed electrical circuit. In some embodiments, a communications object may emit a signal that conveys a privilege of the player wearing the communications object. Bracelets, wristwatches, or collars can be used as communication objects, such that the removal of such an object from a player cannot be accomplished without breaking the closed electrical circuit contained therein, thereby disabling, or de-authenticating the device.

18 Claims, 6 Drawing Sheets

Related U.S. Application Data continuation of application No. 16/456,052, filed on Jun. 28, 2019, now Pat. No. 11,055,958, which is a continuation of application No. 14/076,433, filed on Nov. 11, 2013, now Pat. No. 10,424,153, which is a continuation of application No. 11/683,508, filed on Mar. 8, 2007, now Pat. No. 8,581,721.

(56)                    References Cited

U.S. PATENT DOCUMENTS

| | | | |
|---|---|---|---|
| 2006/0019745 A1* | 1/2006 | Benbrahim | G07F 17/3239 463/29 |
| 2008/0220871 A1* | 9/2008 | Asher | G06Q 30/0212 463/42 |
| 2009/0117989 A1* | 5/2009 | Arezina | G07F 17/323 463/20 |

FOREIGN PATENT DOCUMENTS

| | | |
|---|---|---|
| JP | 2004137720 | 5/2004 |
| JP | 2005115786 | 4/2005 |
| JP | 2005181870 | 6/2005 |
| WO | 2002084602 | 10/2002 |

* cited by examiner

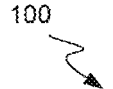
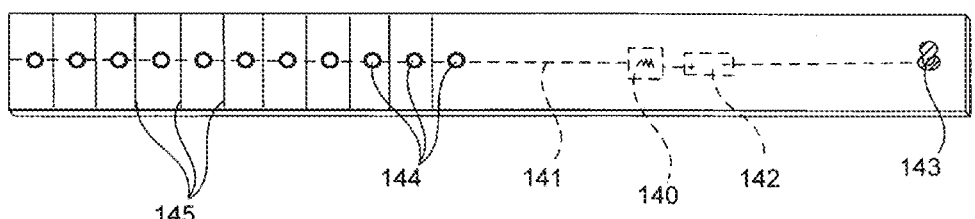
FIG. 2A
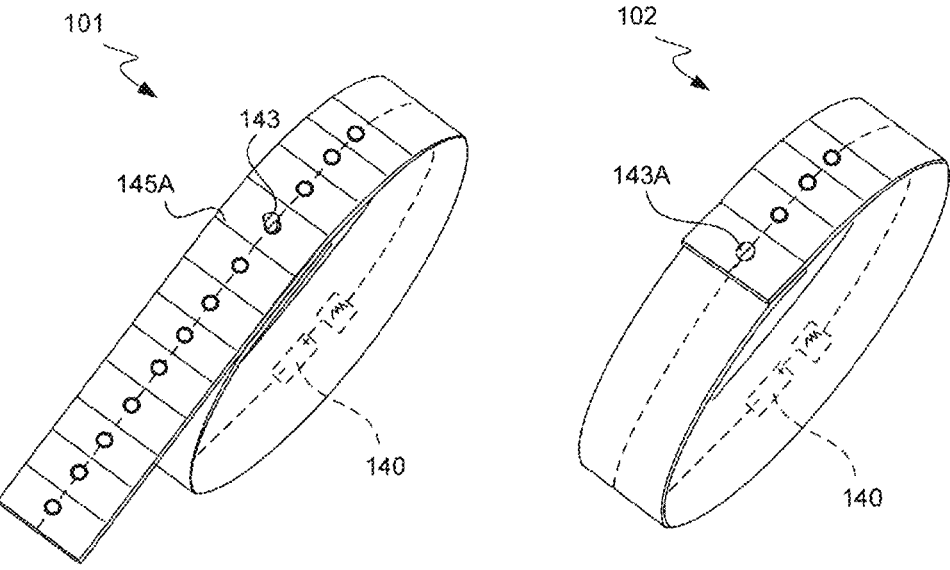
FIG. 2B          FIG. 2C

GAME ACCESS DEVICE WITH PRIVILEGES

CROSS REFERENCE TO RELATED APPLICATIONS

This application is a continuation of U.S. patent application Ser. No. 17/364,943 filed Jul. 1, 2021, which is a continuation of U.S. patent application Ser. No. 16/456,052 filed Jun. 28, 2019 (now U.S. Pat. No. 11,055,958 issued Jul. 6, 2021), which is a continuation of U.S. patent application Ser. No. 14/076,433 filed Nov. 11, 2013 (now U.S. Pat. No. 10,424,153 issued Sep. 24, 2019), which is a continuation of U.S. patent application Ser. No. 11/683,508 filed Mar. 8, 2007 (now U.S. Pat. No. 8,581,721 issued Nov. 12, 2013), each of which is incorporated by reference herein in its entirety.

TECHNICAL FIELD

The present invention relates generally to providing authentication in a gaming environment, and more specifically to systems and methods for verifying the eligibility of a player at a remote gaming location.

BACKGROUND

Radio Frequency Identification ("RFID") tags and systems have been widely adopted in recent years for the traceability and tracking of a wide variety of products and objects. Although these wireless systems are similar to UPC bar code type systems in that they allow for the non-contact reading of various products, items and devices, they are an effective improvement over UPC bar code systems in a variety of ways. In fact, RFID tags and systems can be vastly superior to bar code systems in many manufacturing and other hostile environments where bar code labels are inconvenient or wholly impractical. One advantage of RFID tags and systems is the non-line-of-sight nature of the technology, whereby tags can be read through a variety of substances such as snow, fog, clothing, paint, packaging materials or other conditions where UPC bar codes or other such technologies would be useless.

In most applications, an ordinary RFID system comprises three primary components: 1) a transceiver for transmitting and receiving radio frequency signals, 2) a transponder electronically programmed with data, preferably comprising unique information, and 3) at least one antenna. The transceiver is generally analogous to a bar code scanner, and controls communication within the system by restricting when and where data is written, stored, and acquired. The transponder is analogous to a bar code label, and typically comprises at least a small integrated circuit chip, with this chip often being referred to as an RFID Integrated Circuit ("RFIDIC"). Antennae function as conduits between RFID-ICs and transceivers, as RFIDICs are frequently too small to act as their own antennae and collect a sufficient level of emitted radio signals standing alone. Antennae can be attached to the transceiver, transponder, or both, and are generally used to emit and/or collect radio signals to activate an RFIDIC, read data from the RFIDIC and/or write data to it.

In general, the term "RFID tag" refers to the combination of the RFIDIC and any antennae attached thereto. An RFID tag is essentially a microchip with antennae that listens for a radio query and responds by transmitting an identification code that is usually unique to that RFID tag. In operation, the transceiver emits radio waves that usually range from a fraction of an inch to 100 feet or more, depending upon the power output and radio frequency utilized. When an individual RFID tag passes through an electromagnetic zone covered by the transceiver, it detects the activation signal of the transceiver and responds by emitting its individual recorded code. The "reader" or transceiver then collects this emitted code and passes this data along to a host computer or other like device for processing. Standard apparatuses and methods for manufacturing RFID tags are well known, and instances of such apparatuses and methods can be found, for example, in U.S. Pat. Nos. 6,100,804 and 6,509,217, both of which are incorporated herein by reference in their entirety.

RFID tags come in a wide variety of shapes and sizes and are usually noted for their particularly small and unobtrusive nature. Large RFID tags include, for example, the hard plastic anti-theft devices attached to merchandise in stores, credit-card shaped tags for use in access applications, and screw shaped tags for use with trees or wooden items. In smaller versions, animal tracking tags inserted beneath the skin can be as small as a pencil lead in diameter and one-half inch in length. Applications and venues utilizing some form of RFID tags and systems vary, and can include, for example, package delivery, luggage handling, highway toll monitoring, livestock identification, and automated vehicle identification systems, among others. Other applications are thought to be possible as RFID tag and system technologies become further developed and refined.

It has become popular in recent years for many gaming (i.e., gambling) operators, such as casinos, Internet-based groups, and other gaming establishments, to provide various ways of allowing players to engage in betting and wager type games from remote locations. In such instances, a player can generally participate in gaming activities from a remote gaming terminal that is at some location other than an established casino floor or other authorized and regulated gaming location. Various mediums that can be used for providing a remote gaming terminal include, for example, interactive television (iTV), personal computers, and established kiosks with customized controls and displays, among others. In addition, remote gaming can take place, for example, over a closed network, whereby patrons can engage in gaming activities from established kiosks or their private hotel rooms, as well as online, whereby players can participate in gaming activities on various Internet websites at virtually any location.

A number of problems have emerged, however, with respect to the advent of remote gaming. Many forms of gaming are highly regulated, albeit with wide variations in the rules and regulations existing from jurisdiction to jurisdiction, and it is particularly significant that the location of the player typically governs which set of laws apply. While many gaming operators are generally responsible in providing and running their closed gaming networks and/or Internet gaming websites from locations where gaming is legal, remote access to the gaming activities provided therein can sometimes problematically be had from locations where gaming is illegal, particularly in the case of Internet websites. Furthermore, virtually all jurisdictions that allow some form of gaming have strict laws and regulations with respect to the minimum age of any player that can participate in such games. While age verification and player restrictions can be easily and reliably made on a casino floor or at any other authorized and regulated gaming location, such measures tend to be more difficult and less reliable at remote gaming terminals. In fact, the control of underage gaming at environments such as hotel rooms, personal computers and other remote locations is a continuing problem that limits the growth of legitimate mobile or Internet-based gaming worldwide. The verification of who is trying to place bets from a remote gaming terminal and if such a person is underage is a well-known problem.

As a result of these and other related problems, many gaming operators and regulators have considered the impact of remote gaming and have started to implement various rules and procedures specific to remote gaming activities. In general, these added rules and procedures address some of the problems associated with the enforcement of existing laws and regulations, such as age limits, as well as issues related to the new potential availability of gaming activities to players located in jurisdictions where gaming is illegal. One example of such an added procedure is for the gaming system to require the verification of legitimate players whose identities have been previously confirmed before any remote gaming activities can commence. In some instances, players must enter individualized identification codes, such as PIN numbers, into the remote gaming terminal to identify themselves before gaming may begin. Other possible procedures involve the reading of a fingerprint or some other biometric indicator by a connected device at the remote gaming terminal to verify the identity of a player before gaming can begin.

Such verification procedures and systems can be readily defrauded or circumvented in many cases, however, as an underage child could learn the access code of a parent or other adult and then engage in gaming activities illegally. In addition, a legitimate player might properly log in to such a gaming system at a remote gaming terminal and then completely hand off control to another user or otherwise permit another player to play. Another disadvantage of such verification procedures and systems is that they are all a "one-time" process, such that gaming activities at the remote gaming terminal are allowed to continue on indefinitely after an initial verification procedure, despite the potential for changes that would result in the termination of gaming activities in a more closely monitored environment. Such changes could involve a significant reduction in the capacity in the legitimate player, a criminal interception or interference of a gaming session by unscrupulous third parties, or simply a handing off of the remote gaming terminal from the legitimate player to an underage or otherwise unauthorized user.

While existing systems and methods for providing player verification in remote gaming terminals may grant some protection against unauthorized or improper gaming activity, improvements and better systems and methods are usually welcomed and encouraged. In particular, there exists a need for such systems and methods to be more reliable in verifying players correctly and not allowing unauthorized players access to various gaming events.

SUMMARY

It is an advantage of the present invention to provide improved and more reliable systems and methods for verifying actual players at remote gaming terminals. This can be accomplished by providing secured communication objects having RFID tags to players within a gaming player verification system, with such a system also having a plurality of player tracking devices adapted to communicate with these secured RFID communication objects.

According to a particular embodiment of the present invention, the provided system can involve one or more communication objects adapted to be securely worn by players within a gaming player verification system, wherein each such communication object comprises an RFID tag and is adapted to communicate via radio frequency waves. Security for these communication objects can result from establishing a closed electrical circuit associated with the RFID tag within the object when it is assigned to and worn by a player, with the object becoming disabled or otherwise de-authorized upon any break in this closed electrical circuit. The object is thus adapted to alter its communication pattern in response to any break of its closed electrical circuit. Good candidates for such player assigned and securely worn RFID communications objects can include necklaces, collars, wrist bracelets, wristwatches, belts, ankle bracelets, and the like.

In various embodiments, the separation of a communication object from a player can be determined in other ways besides the breaking of an electrical circuit. In various embodiments, a communication object includes a temperature sensor. The temperature sensor may be used to detect the body heat from the player. If the communication object becomes separated from the player, the temperature sensor may register a temperature other than a normal human body temperature. E.g., the temperature sensor may register an ambient room temperature. In various embodiments, a communication object may include a pressure sensor. The pressure sensor may register the pressure from the contact with the player's body. E.g., the pressure sensor may register pressure as the weight of the communications object presses the pressure sensor into the player's body. When the communications object is separated from the player's body, the pressure sensor may register a reduced pressure. It may thereby be determined that the communications object has been separated from the player's body. In various embodiments, a communications object may include a moisture detector for detecting moisture from a player's body, such as player sweat. In various embodiments, a communications object may include a salinity detector for detecting salt on a player's body. In various embodiments, a communications object may include a pH detector for detecting the pH of e.g., moisture on the player's body. Each of these sensors may be capable of registering different input levels depending on whether or not the sensors are in contact with a player's body. It may thereby be determined whether or not the communications device has been separated from the player's body.

The provided system can also involve one or more player tracking devices adapted to obtain information regarding a specific player from such a communication object worn by that player, as well as at least one computer server having a player verification program adapted to verify whether obtained information regarding a specific player is adequate or acceptable according to one or more set criteria for verifying a player. Such criteria can include the presence of an unbroken electrical circuit within a registered and assigned player communication object. This computer server can be adapted to deny the initiation or continuation of a particular gaming event when its player verification program determines that any information obtained from a prospective player is inadequate or unacceptable, or when an insufficient amount of information has been obtained. This player verification program can also be adapted to verify multiple submissions of information regarding a specific player during the progress of or between one or more gaming events. The provided system can also involve a database containing specific informational data with respect to a plurality of players within the system, as well as communication links or paths between various system items, such as a communication path between a player tracking device and a computer server.

According to another embodiment of the present invention, a method of providing automated player verification within a gaming environment can include the steps of providing one or more gaming events involving the placement of a wager, the presentation of a game, and the grant of a monetary award based upon the outcome of the game, receiving a request by a specific player to participate in a particular gaming event, obtaining information regarding that player from a communication object worn by the player, verifying that the obtained information is acceptable according to one or more set criteria, and permitting the gaming event to commence or continue. This method can include situations where the pertinent information becomes unacceptable when the communication object is no longer worn by said player. This method can also include the use of communication objects adapted to communicate via radio frequency waves, such as RFID tags associated with a closed electrical circuits within the worn communication objects. The method can thus also include steps of detecting breaks in these circuits, as well as denying gaming events to commence or continue.

Other potential method steps can include associating the player request to play a game with a specific player account associated with that player, and determining whether that player is authorized to participate in the requested gaming event. In order to provide further player verification, various method steps can also be repeated as desired, with such repeated steps including the steps of obtaining information from the communication object, verifying that this obtained information is acceptable according to one or more criteria, and permitting a gaming event to commence or continue. These repeated steps may be continuously performed or can be performed at set or random intervals.

Other variations can also be practiced, such as those involving all system components within a single gaming machine or device, the incorporated use of one or more master gaming controllers in connection with the system, and/or the integration of the system with a new or pre-existing player tracking system and player tracking host. Other devices and functions beyond gaming machines and remote gaming terminals can also be included, such as the use of RFID readers in association with opening hotel room door locks, paying for retail purchases and paying for restaurant tabs in associated with the provided system and method. In addition, the provided systems and methods may also be used for securely and reliably identifying users in contexts outside of a casino or gaming context.

Other methods, features and advantages of the invention will be or will become apparent to one with skill in the art upon examination of the following figures and detailed description. It is intended that all such additional methods, features and advantages be included within this description, be within the scope of the invention, and be protected by the accompanying claims.

BRIEF DESCRIPTION OF THE DRAWINGS

The included drawings are for illustrative purposes and serve only to provide examples of possible structures and process steps for the disclosed inventive systems and methods for providing player verification in remote gaming terminals and other associated locations. These drawings in no way limit any changes in form and detail that may be made to the invention by one skilled in the art without departing from the spirit and scope of the invention.

FIGS. 2A through 2C illustrate in perspective view several stages of application of a player worn RFID bracelet for use in association with the gaming machine of FIG. 1 according to one embodiment of the present invention.

DETAILED DESCRIPTION

Figure 1:
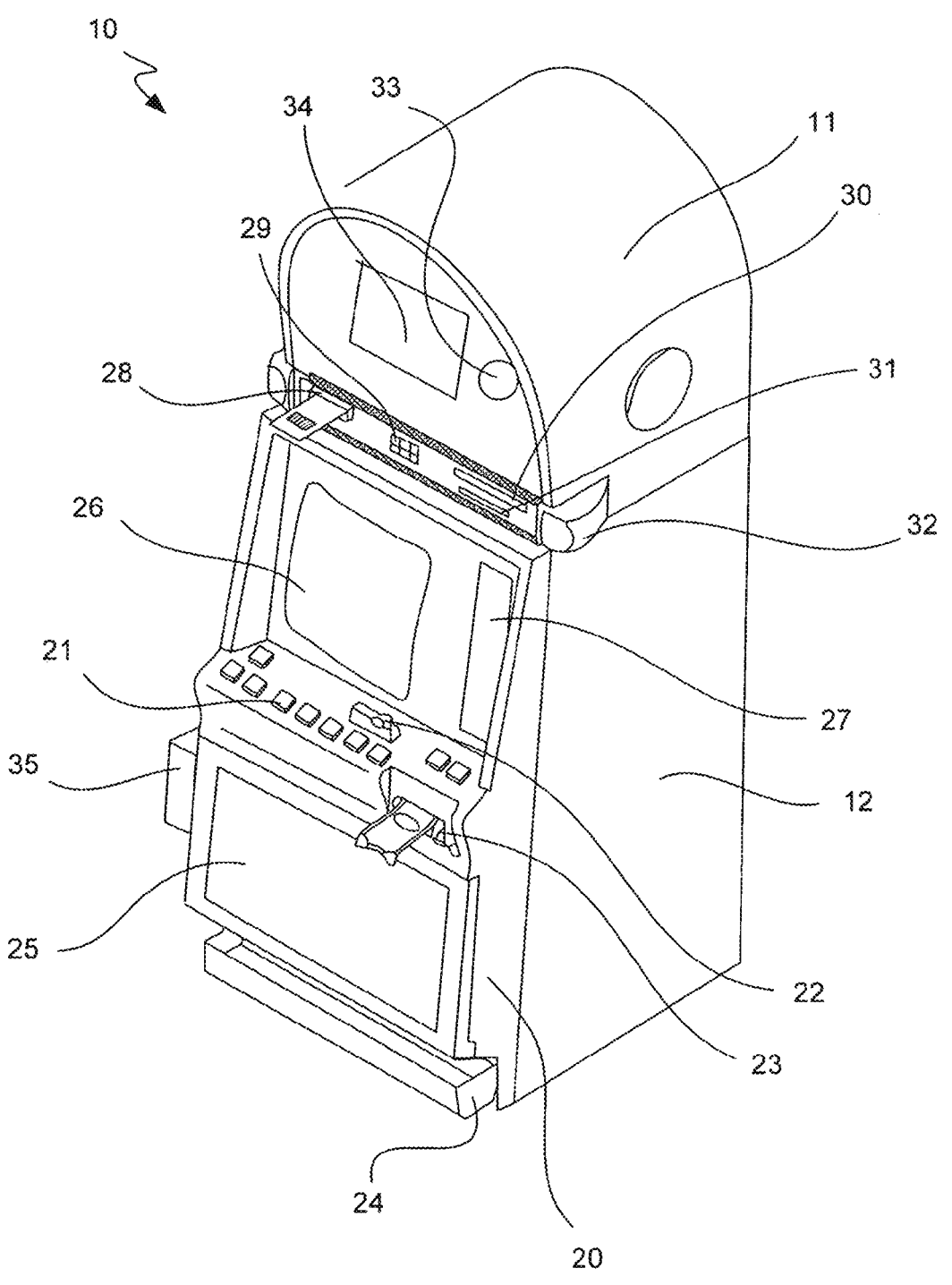
FIG. 1 illustrates in perspective view an exemplary gaming machine according to one embodiment of the present invention.

Exemplary applications of systems and methods according to the present invention are described in this section. These examples are being provided solely to add context and aid in the understanding of the invention. It will thus be apparent to one skilled in the art that the present invention may be practiced without some or all of these specific details. In other instances, well known process steps have not been described in detail in order to avoid unnecessarily obscuring the present invention. Other applications are possible, such that the following example should not be taken as definitive or limiting either in scope or setting.

In the following detailed description, references are made to the accompanying drawings, which form a part of the description, and in which are shown, by way of illustration, specific embodiments of the present invention. Although these embodiments are described in sufficient detail to enable one skilled in the art to practice the invention, it is understood that these examples are not limiting; such that other embodiments may be used, and changes may be made without departing from the spirit and scope of the invention.

One advantage of the present invention is the provision of a more reliable system and method for initially verifying players at remote gaming terminals, such that a higher level of confidence can be had that any person engaging in a gaming event at a remote gaming terminal is an appropriate person for that gaming event. In one embodiment, information specific to a given player is obtained after or during the process of receiving a request from that player to participate in a specific gaming event, such that unauthorized access to that gaming event can be minimized or prevented altogether despite the presence of an adequate coin, bill or ticket input, or a correct command, game play request or other such input.

Another advantage of the disclosed system and method is the ability to verify a player repeatedly during the progress of the gaming event or session at the remote gaming terminal. This advantageously hinders the ability of players to log in to the system properly and then hand off control of the remote gaming terminal to an underage or otherwise unauthorized player. This is accomplished through the subsequent repetition during the gaming event or session of the steps of obtaining information specific to the given player, verifying that the obtained information is adequate, and permitting the requested gaming event to commence or continue.

Yet another advantage of the disclosed system and method is the ability to incorporate the system and method into other items and ventures that extend beyond the play and administration of wager based games and gaming. Accordingly, it should be noted that while the inventive player verification system and method disclosed herein is being described primarily with references to and illustrations of remote gaming terminals, gaming establishments, gaming machines and wager based games of chance in general, this verification system is readily adaptable for use in other types of businesses and environments, such that its use is not restricted exclusively to remote gaming terminals, gaming establishments, gaming machines or games of chance. Examples of such other items and ventures can include individual identifications and payments with respect to hotel and transportation reservations and check-ins, restaurant visits, retail outlet registrations and purchases and the like. Such uses can be in conjunction with a gaming based system, or separately altogether.

As an introduction to the various embodiments described herein, a very specific example under a particular implementation according to the present invention will now be provided. It will be readily appreciated that the following example is picked from a potentially infinite number of possibilities that may occur under the present invention, such that this example is not limiting in any way. According to this example, a specific Player A checks in at an established hotel having a gaming casino on the premises. Upon check in, the identity of Player A is affirmatively verified by a hotel desk clerk, using various items such as a driver's license, credit card, specific player tracking and rewards card, and the like, or any combination thereof, any or all of which bear the name and/or a likeness of Player A.

During the check in process, Player A indicates that he would like to be able to play in one or more gaming events at a remote terminal during the stay at the hotel and casino. Upon such a request, the player is then fitted with a temporary ID bracelet containing a closed circuit and RFID tag therein. Upon this fitting, the unique RFID tag contained therein has its contents recorded, such that all associated remote terminals will recognize that Player A is at that location when the bracelet is active and on this player. After settling into his room, the player decides to play at a remote gaming kiosk near the hotel pool. Because he continues to wear his unique RFID bracelet, the gaming kiosk accepts Player A as a legitimate player, opens his account locally on the kiosk, and permits game play to commence. After playing at the kiosk for some time, Player A concludes his session, is appropriately credited to, or debited from his player account electronically, and then proceeds to a lounge chair at the pool. A few minutes later, he orders a drink and is able to have the drink paid or accounted for by placing his bracelet in proximity to a different "remote terminal" (i.e., a portable RFID tag reader) carried by the drink attendant.

Later that afternoon, Player A stops in at an associated boutique store within the hotel and purchases a few personal items. Rather than pay by cash, check, or credit card, however, he merely positions his uniquely identifying bracelet in close proximity to a stationary RFID tag reader at the store register, at which point his personal account at the hotel is again debited for the purchased items. Upon returning to his hotel room, Player A positions his bracelet in close proximity to the door lock on his hotel room door, whereupon another RFID tag reader built into the door lock reads the unique tag in his bracelet and unlocks the door. During a brief respite in his hotel room, Player A checks in and plays a few games of video poker at the gaming station on his hotel room television and accompanying set top box and hardware, in much the same manner as the earlier session at the pool kiosk. At dinner at a hotel restaurant that night, Player A pays or accounts for the cost of the meal by placing his bracelet near another portable RFID tag reader carried by the waiter or cashier, similar to the way that his retail purchases were made at the boutique store earlier.

Later that night, in a cafe within the hotel, Player A is able to play at a bank of remotely located slot machines by using his bracelet as a means for identifying himself and verifying that he is authorized to participate in remote gaming. Although he can use cash to play at this bank of gaming machines, he again uses his ID bracelet to access his personal account such that any winnings are credited, and any losses are debited to this personal account. Prior to a brief break from game play, Player A temporarily closes, stays, or otherwise suspends his session at a particular gaming machine. While washing up during this break, he accidentally bangs the ID bracelet fairly hard, such that the bracelet considers the hit to be a tampering attempt. The bracelet accordingly breaks the active circuit therein or otherwise disables itself, such that it is no longer actively operating as an affirmative remote identifier for Player A. The player is then unable to be verified at the bank of gaming machines in the cafe, and thus cannot resume play after his break. After a set length of time, his temporarily closed or suspended gaming session terminates, and his account is credited or debited accordingly. Player A can no longer participate in any activity requiring the use of his RFID bracelet until he goes to have this bracelet reset by the hotel front desk or some other appropriate administering agent authorized within the system.

Again, this specifically detailed example represents only one of the myriad possible outcomes and arrangements of remote player identification, game play and other identifying events and interactions under an RFID tag system and method for remote player verification. The following detailed description will now provide for other possibilities and implementations of these and other such systems and methods at varying levels. Again, it should be remembered that not all implementations of the inventive systems and methods disclosed herein must be associated with a gaming system or establishment, and that details under such systems and establishments are provided only for purposes of illustration. While any such similarly identifying use is thus possible, uses within a gaming environment are thought to be particularly useful, such that further examples will be provided within a gaming context. In particular, an especially useful application can be had with respect to gaming machines and other standalone gaming devices, where supervision and manual interaction with casino or gaming operator personnel can be relatively low with respect to other gaming events.

Referring first to FIG. 1, an exemplary gaming machine according to one embodiment of the present invention is illustrated in perspective view. Gaming machine 10 includes a top box 11 and a main cabinet 12, which generally surrounds the machine interior (not shown) and is viewable by users. Main cabinet 12 includes a main door 20 on the front of the machine, which opens to provide access to the interior of the machine. Attached to the main door are typically one or more player-input switches or buttons 21, one or more money or credit acceptors, such as a coin acceptor 22, and a bill or ticket validator 23, a coin tray 24, and a belly glass 25. Viewable through main door 20 is a primary video display monitor 26 and one or more information panels 27. The primary video display monitor 26 will typically be a cathode ray tube, high resolution flat-panel LCD, plasma/LED display or other conventional electronically controlled video monitor. Top box 11, which typically rests atop of the main cabinet 12, may also contain a bill or ticket validator 28, a key pad 29, one or more additional displays 30, a card reader 31, one or more speakers 32, one or more cameras 33, and a secondary video display monitor 34, which may also be a cathode ray tube, high resolution flat-panel LCD, plasma/LED display or other conventional electronically controlled video monitor.

It will be readily understood that gaming machine 10 can be adapted for presenting and playing any of a number of gaming events, particularly games of chance involving a player wager and potential monetary payout, such as, for example, a wager on a sporting event or general play as a slot machine game, a keno game, a video poker game, a video blackjack game, and/or any other video table game, among others. While gaming machine 10 can typically be adapted for live game play with a physically present player, it is also contemplated that such a gaming machine may also be adapted for game play with a player at a remote gaming terminal. Such an adaptation preferably involves the implementation of one or more types or modes of communication from the gaming machine to at least one outside location, such as a remote gaming terminal itself, as well as the incorporation of a gaming network that is capable of supporting a system of remote gaming with multiple gaming machines and/or multiple remote gaming terminals.

Additional components and devices that can be used to permit gaming machine 10 to be used in a remote gaming environment will now be presented in greater detail. One such item can be a player tracking, authorizing and/or identifying device 35. Although shown as an auxiliary device attached to the lower left side of main door 20 in FIG. 1, it will be readily appreciated that such a device can be placed anywhere about, on or within gaming machine 10, and can in fact be integrated within the gaming machine so as to be less conspicuous, as desired. In fact, it is specifically contemplated that the size, shape, location, and actual presence of any and all of the items shown on gaming machine 10 can vary, and that any and all gaming machines can be readily adapted for use with the present invention. With respect to player identifying device 35, this device can be, for example, an RFID transceiver adapted to interact with one or more RFID tags outside of the gaming machine, and in particular those worn, carried, or otherwise controlled by various registered players. In a preferred embodiment, player identifying device 35 is adapted to act as a conduit between such outside RFID tags and a player tracking system/network, a player accounting system/network, one or more processors at the gaming machine itself, or any combination thereof. Such an RFID transceiver can be, for example, an RI-R00-321A model Series 6000 Reader Module 56110 transceiver manufactured by Texas Instruments of Dallas, Tex., although many other off-the-shelf and customized brands and types of RFID transceivers can also be effectively utilized for such a purpose. Besides acting as an RFID transceiver, player identifying device 35 can also act as or be coupled with a standard player tracking device used for player loyalty and rewards programs, with such devices and programs being well known in the art. In fact, it is specifically contemplated that the RFID transceivers of the present invention be incorporated into existing player tracking systems.

A wide variety of types, styles, sizes and shapes of RFID tags and objects can be used in conjunction with player identifying device or RFID transceiver 35, and such RFID tags can also be off-the-shelf or customized as desired for any particular application. Of particular importance is that such RFID tags be administered or managed in a sufficient manner by a casino, gaming operator, gaming regulator, or other competent authority, such that some degree of confidence can be had with respect to the correlation between an RFID tag being read and the player or person who is wearing, carrying, or otherwise controlling the tag. Although a virtually endless number of possible models, types and brands of RFID tags and be used for such purposes, several specific examples are given here for purposes of illustration. One example of an off-the-shelf RFID tag can be an RFID card, with such cards being issued or checked out to players to use at various remote gaming terminals. Such cards could include, for example, the RI-TH1-CBIA model 13.56 MHz Vicinity Card Transponder, also manufactured by Texas Instruments. Other card examples can include the RI-TRP-R4FF read-only model and the RI-TRP-W4FF read-write model Card Transponders, also manufactured by Texas Instruments.

Other RFID devices beyond cards could include tokens, objects or simply RFID tags themselves that can be inserted or attached to other devices, such as, for example, the RI-TRP-R9QL read-only model and the RI-TRP-W9QL read-write model 30 mm Disk Transponders, as well as the RI-TRP-R9UR read-only model and the RI-TRP-W9UR read-write model 85 mm Disk Transponders, all of which are also manufactured by Texas Instruments. Other off-the-shelf examples can include a key ring or keychain with an embedded RFID tag, such as the RI-TRP-RFOB-01 read-only model and the RI-TRP-WFOB-01 read-write model Keyring Tags, also manufactured by Texas Instruments. Of course, many other models and brands of RFID tags can also be used in conjunction with the inventive systems and methods described herein, and such systems and methods are by no means limited to the foregoing relatively small listing of possible examples.

One problem with utilizing RFID cards, tokens, charms, or other such objects that are merely loosely checked out to players is that there is always the potential for such objects to be freely transferred among players or other individuals. While the majority of players may not wish for others to use such devices registered in their name and will thus take appropriate safeguards against improper transfers, there is a high potential for theft, fraud and unauthorized uses in a system utilizing such freely transferable devices. In addition, many casinos, gaming operators and other similar establishments would also prefer the option of having a system whereby such identifying devices are not so freely transferable, for many obvious reasons. Accordingly, it is desirable that some forms of these devices be more secure, and that there be a high likelihood that only the registered player or person for a given device can be using that device in an authorized manner. One way of achieving such an objective is to include one or more RFID tags in a worn device, such as a collar, wristwatch, wrist bracelet, ankle bracelet or the like, in a manner such that the device is disabled or otherwise deactivated when removed from the legitimate wearer.

Turning now to FIGS. 2A through 2C, several stages of application of one example of a player worn RFID bracelet for use in association with the gaming machine of FIG. 1 are illustrated in perspective view. As first shown in FIG. 2A, disposable RFID bracelet 100 resembles in many aspects a disposable hospital type bracelet, in that it is a one-use disposable item, can be relatively cheaply mass-produced, is intended to be applied to a wearer by one or more authorized persons of an operating entity, can be applied to most individuals regardless of size, is adapted to aid in identifying the wearer, and is adapted such that it becomes readily apparent when the bracelet has been removed from the original wearer. Such disposable bracelets can be readily mass produced, shipped and stored in a flat format with multiple holes, slots, or other devices for adjusting the size to fit a given wearer, and can be made of a pliable plastic, rubber, or other suitable material, as desired.

As also shown in FIG. 2A, disposable bracelet 100 contains an embedded RFID tag 140 and an embedded circuit strip 141, which is designed to form a closed circuit when applied to and worn by a user. Circuit strip 141 also forms a convenient antenna for the RFID tag 140. A flat battery 142 may also be included and is preferably also embedded. Although not necessary for many passive and simpler RFID tags, such a battery may be needed where a relatively powerful RFID tag is used. In addition, such a battery may also be necessary to power and accurately monitor any closed circuit formed by circuit strip 141. Disposable bracelet 100 also comprises an end knob 143 and plurality of holes 144 adapted for securely applying the bracelet to a user, with the combination of end knob 143 and any of holes 144 comprising a one-way, one-time fastener, as will be readily appreciated by one skilled in the art. End knob 143 is preferably metal or otherwise adapted as an electrical conductor and is electrically connected to circuit strip 141. Each hole 144 preferably includes a metal eyelet or other conductive device, and is also electrically connected to circuit strip 141, such that a closed electrical circuit is formed when end knob 143 is placed through any given hole 144 and securely fastened within or atop that hole. A plurality of grooves 145, perforations, markings or other band removal facilitating devices are also preferably contained on disposable bracelet 100, such that any excess bracelet band beyond a utilized hole 144 can be readily removed.

Continuing on to FIG. 2B, the disposable bracelet 100 of FIG. 2A is shown in a permutation 101 as it is first being applied to the wrist (not shown) of a player or wearer. With the bracelet wrapped around the wrist of a player, end knob 143 has been placed through a given hole, as shown. The remainder of the bracelet beyond the used hole can be cut or detached at marking or groove 145A, and the end knob can then be clamped, pressed, or otherwise distorted such that it cannot be pulled back through the used hole without doing irreparable damage to the bracelet. Moving on to FIG. 2C, permutation 102 of the bracelet shows that the excess band beyond the used hole has been removed, that the end knob 143A has been deformed or clamped in place such that it cannot be readily undone without tearing at the band, and that a solid contact has been formed between the clamped end knob 143A and the eyelet of its mating hole, such that a closed electrical circuit along the embedded circuit strip has been formed. The top of clamped end knob 143A (and possibly pre-clamped end knob 143 as well) may comprise a plastic, rubber, or other electrically insulating cap, both to render the bracelet as more aesthetically pleasing and to hinder fraudulent attempts to create alternate closed electrical circuits. Alternatively, such a cover or cap may be pasted, glued, or otherwise attached atop end knob 143A after it is deformed. The bracelet is now securely worn and ready for use by the player.

It is specifically contemplated that the application of an RFID bracelet to a player be accomplished or at least supervised by one or more authorized personnel of the gaming operator or other entity managing the player tracking system using such RFID bracelets. Not only can control and distribution of such bracelets be important, but the time of application is an ideal opportunity to check player ID, verify that a player is of age and otherwise eligible for gaming, apply the bracelet correctly, and program or issue code to the RFID tag within the bracelet, if necessary. It should also be appreciated that such a disposable bracelet can be readily removed by a player at virtually any time due to the pliable nature of its material of construction. However, consequence of such a removal is that the embedded closed electrical circuit will most likely be broken. In this manner, fairly reliable regulation of bracelet wearers or players can be had, since the embedded RFID tag can be adapted to become disabled or to communicate an appropriate signal when this closed circuit has been broken, such that player verification through the compromised bracelet is no longer possible.

To this end, the closed electrical circuit formed by circuit strip 141 can be used to power the RFID tag itself, such that the RFID tag becomes disabled when the circuit is broken. To ensure that any subsequent reconnection of the circuit strip into a full circuit does not then re-enable the bracelet, any convenient feature such as flash memory, erasable RAM or a simple validation register can be used. Alternatively, the RFID tag can be a "smart" tag powered by the battery at all times, with the closed electrical circuit formed by circuit strip 141 merely acting as a monitored circuit, with appropriate action taken within the RFID when it detects that this circuit has been broken. Such action can be a simple "NO" signal or register to any potential verification or other authorization request, with information on the purportedly prospective user still being communicated from the now compromised bracelet. In this manner, information that might be relevant to any fraud or misuse can be communicated, tracked, recorded and/or acted upon more readily.

In addition to this closed electrical circuit, other features that can be added to such a bracelet to further discourage or prevent misuse or fraud can include a pulse sensor adapted to detect and monitor a pulse, and to send a signal to the RFID tag when the detected pulse disappears, as well as one or more strain gauges adapted to sense when the pliable material of the bracelet is being unduly stretched or torn, and to similarly send a signal to the RFID tag if such an event is detected. Such added devices may also be connected to the battery for power, if needed, and may also be connected to the closed electrical circuit or some other circuit in communication with the RFID tag. Various other specifics regarding various RFID bracelet features, applications, uses, monitoring, and disablement are discussed in greater detail below.

Figure 3A:
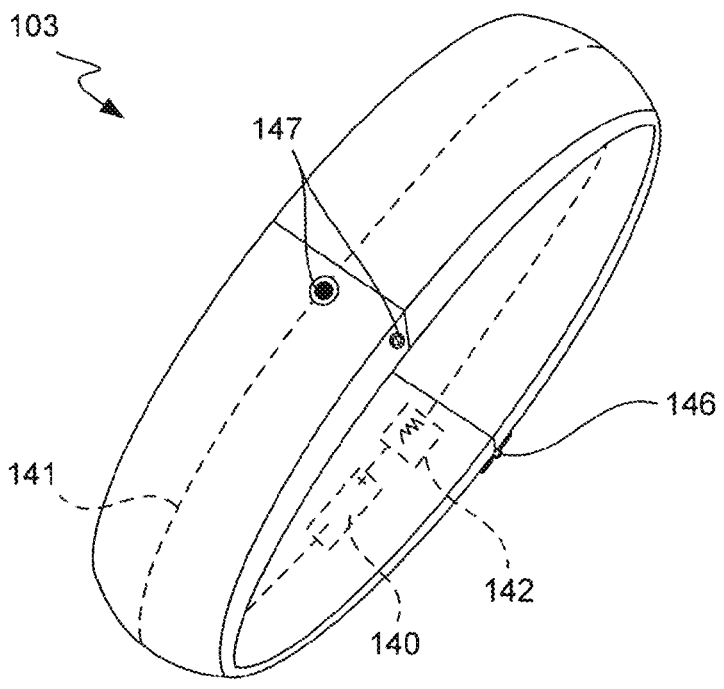
FIGS. 3A and 3B illustrate in perspective view several alternative examples of player worn RFID communication items for use in association with the gaming machine of FIG. 1 according to one embodiment of the present invention.
Figure 3B:
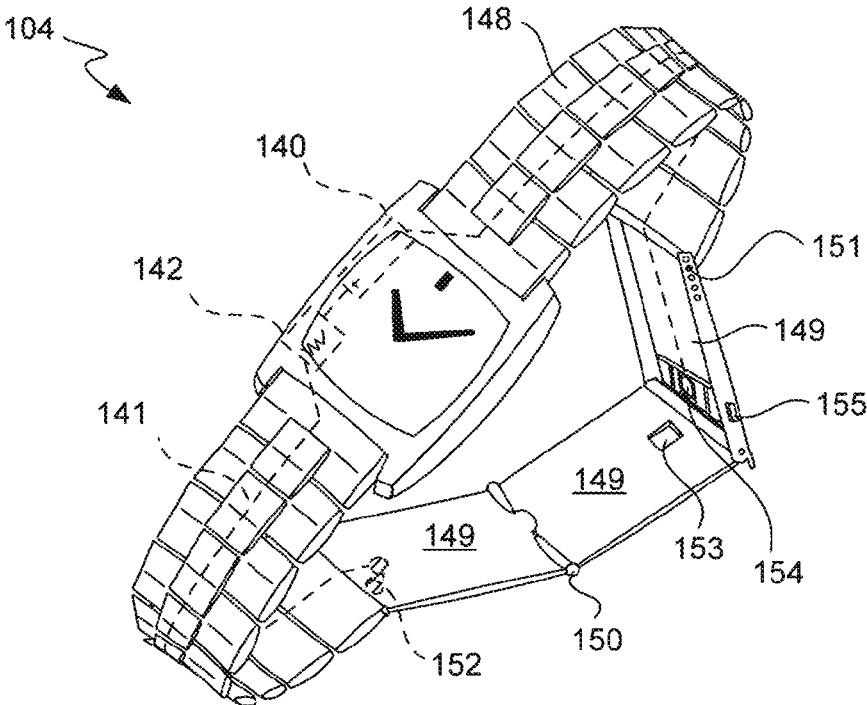

Turning now to FIGS. 3A and 3B, several alternative examples of player worn RFID communication items for use in association with the gaming machine of FIG. 1 are similarly illustrated in perspective view. Unlike the exemplary disposable RFID bracelet of FIGS. 2A through 2C, bracelet 103 of FIG. 3A and wristwatch 104 of FIG. 3B are preferably reusable items that can be worn and used by different users within a given player verification system. Because these items can be reused many times over, it becomes practical for the item cost to be substantially higher. Hence, more "fashionable" items such as a hard plastic stylish bracelet or a nice wristwatch can be used, with such items having more appeal to players who might not wish to wear an unusual looking "hospital-style" bracelet. A wide variety of types, colors and styles can be used for such items, with each variation preferably coming in a number of different sizes, such that any given user may have a choice of RFID objects to wear. Various varieties, themes and charms can be used on or with such reusable worn communication items, and more desirable higher end items, such as a very nice wristwatch, for example, may be assigned to MVP players, or those who pay extra monies or player rewards points for the privilege, if desired.

Referring first to FIG. 3A, hard plastic jewelry style bracelet 103 contains an embedded RFID tag 140, an embedded circuit strip 141 designed to form a closed circuit when applied to and worn by a user, and an embedded battery 142, similar to the foregoing disposable bracelet 100. A hinge 146 connects two halves of the bracelet to facilitate its application and removal, and one or more buttons or releases 147 are adapted to disengage an internal locking mechanism (not shown) such that the bracelet can be opened and removed. As in the foregoing example, it is preferable that such a removal be readily accomplished by a wearer, albeit with the consequence that the embedded closed electrical circuit is broken thereby disabling the bracelet. Although only one knob or button 147 might be necessary, it is thought that including more than one such device and requiring mutual activation for removal might lessen the chances of accidental removal and the resulting inconveniences attaching thereto. Also, it will be readily apparent that each bracelet may likely include mating face plates or other internal devices located at the end of each bracelet half and adapted to facilitate the formation of the embedded closed electrical circuit when the bracelet is applied to a wearer and closed.

Referring next to FIG. 3B, jewelry style wristwatch 104 similarly contains an embedded RFID tag 140, an embedded circuit strip 141 designed to form a closed circuit when applied to and worn by a user, and an embedded battery 142. A flexible watch band 148 connects the watch face with a standard fold over safety clasp 149, which comprises three sections connected by hinges 150 and pins 151. As will be readily understood by those skilled in the art, the fold over safety clasp 149 folds up on itself as the wristwatch 104 is being applied to a wearer, with end knob 152 protruding through hole 153 and into a receiving socket 154, where it is held in place. A sliding mechanism within socket 154 then allows the end knob 152 to be pulled out when release 155 is pressed, with a similar release preferably located on the opposing end of the socket 154 and sliding mechanism. As in the disposable bracelet 100, end knob 152 is preferably made of an electrically conducting material, and preferably comprises one end of embedded circuit strip 141. Socket 154 preferably comprises the other end of embedded circuit strip 141, such that a closed electrical circuit is formed when end knob 152 mates with socket 154 upon application of the wristwatch 104 to a wearer. Although watchband 148 may be metallic or otherwise electrically conductive, it is preferably that at least one section of the three sections comprising fold over safety clasp 149 be of a plastic or other suitable non-conducting material, such that a permanent closed circuit is not formed.

Similar to the foregoing embodiment, reusable RFID bracelet 103 and wristwatch 104 may also include additional devices such as pulse sensors or strain gauges adapted to detect tampering efforts more readily. Other features of both disposable and reusable bracelets, wristwatches, collars, ankle bracelets and the like can include an embedded GPS locating device, waterproof or water resistant abilities, and the use of various encryption items and techniques, such as a random encryption key associated with each unique communication bracelet item, to better distinguish each unique RFID device where many may be in the same general region. Further, it may also be preferable to require that a special machine or application device be used to apply each worn RFID device, such that players and other purported users are even less likely to be able to freely transfer these devices amongst each other.

Other items and features that can be used to provide better security and reliability in a system using such communication items can include a wearable dongle or other insertable that can be inserted into a player tracking device, as well as an optical scanner or reader on the player tracking device adapted to read one or more optical patterns on the player worn bracelet or communication item. Such an optical pattern can comprise, for example, a simple bar code, a two-dimensional bar code, and/or a rewritable bar code, such as what might be implemented using electronic paper or another like device or system. In this manner, readings can be made based on two separate forms of communication, such as a radio frequency signal from an embedded RFID tag and an optical scan of a bar code, with acceptable readings from two different sources being required before a proper player validation or authorization is granted by the reading device, gaming machine or other associated device.

While the three examples illustrated above refer only to bracelets or wristwatches, it will be understood that many more types of devices can be used, and that such devices can be worn securely in other places beyond the wrist of the player or user. For example, a collar or relatively tight necklace around the neck, an ankle bracelet or like device, and a belt or other like device about the waist may all be practical applications of a securely worn communication object that cannot be readily removed by a wearer without breaking a closed and monitored circuit. It will also be readily appreciated that other communication means can also be used in lieu or in conjunction with an RFID means or system, with such alternative means including the bar code or electronic paper examples given above, for example. Of course, other implementations are also possible, although many may not come with the same safeguards afforded by such a securely worn device with an internal closed circuit.

In addition, while the foregoing communication items, readers and any system encompassing these devices can involve establishing player accounts with known and identified players or users, it is also specifically contemplated that such a system can be established for anonymous verified gaming. Under such a system embodiment, it might only be necessary to verify that a player or user be eligible to participate in gaming events, which may be apparent merely upon a visual review of many individuals by authorized device applying personnel. In such instances, the worn bracelet or communication item would not definitively identify the player or user but would merely provide a confirming communication to an inquiring reading device that a correctly verified wearer is authorized to participate in gaming events or other events of interest. If desired, anonymous player accounts may also be used in conjunction with such an anonymous system, where a nameless account is established and associated with a given bracelet or communication device upon the application of the device to the anonymous player or user. A checkout station or printer having a reader adapted to communicate with the anonymously worn communication object may then be used to allow the user to cash out from his or her anonymous account, and direct interaction with a cashier utilizing a reader may also be possible.

In yet another embodiment, it is contemplated that the inventive RFID device may also include one or more added mechanisms for providing information to the wearer. For example, a small display or speaker could alert the wearer of possible tournaments, shows, events, and openings or last calls of restaurants, lounges, stores, or other areas of interest within a casino or establishment. Such a display or speaker could also provide player tracking information to the wearer, as well as tournament or event results or updates, and might also provide news, weather, sports updates, and other informational items of interest, for example. A display may be a simple LED or dot matrix display adapted to provide text messages, or the display could be a small video screen or panel in the event that a more sophisticated and expensive unit is used. Similarly, a speaker could be a special speaker adapted for a full range of sounds and voice messages, or a simple speaker adapted for emitting a range of alert beeps or noises, as desired.

Although it is contemplated that any form of RFID device disclosed herein could be used with any kind of speaker or visual display, one particular form could be an "info watch," where the display of the wristwatch 104 shown in FIG. 3B is adapted for such an informational-display. Of course, this RFID wristwatch may also show the time on this display, which can overlay any information provided, such as on a small video display, or which can be preempted whenever other information is to be provided or shown. Such an informational watch can display content that might be pre-programmed into it at appropriate times or intervals, such as tournament notes, show times and restaurant opening times, as well as content that might be transmitted to it while a wearer is on the premises. Overall, it is thought that such an info watch would have greater functionality, and thus be more attractive to potential users, such that players would be more receptive to the idea of wearing this RFID device.

Figure 4:
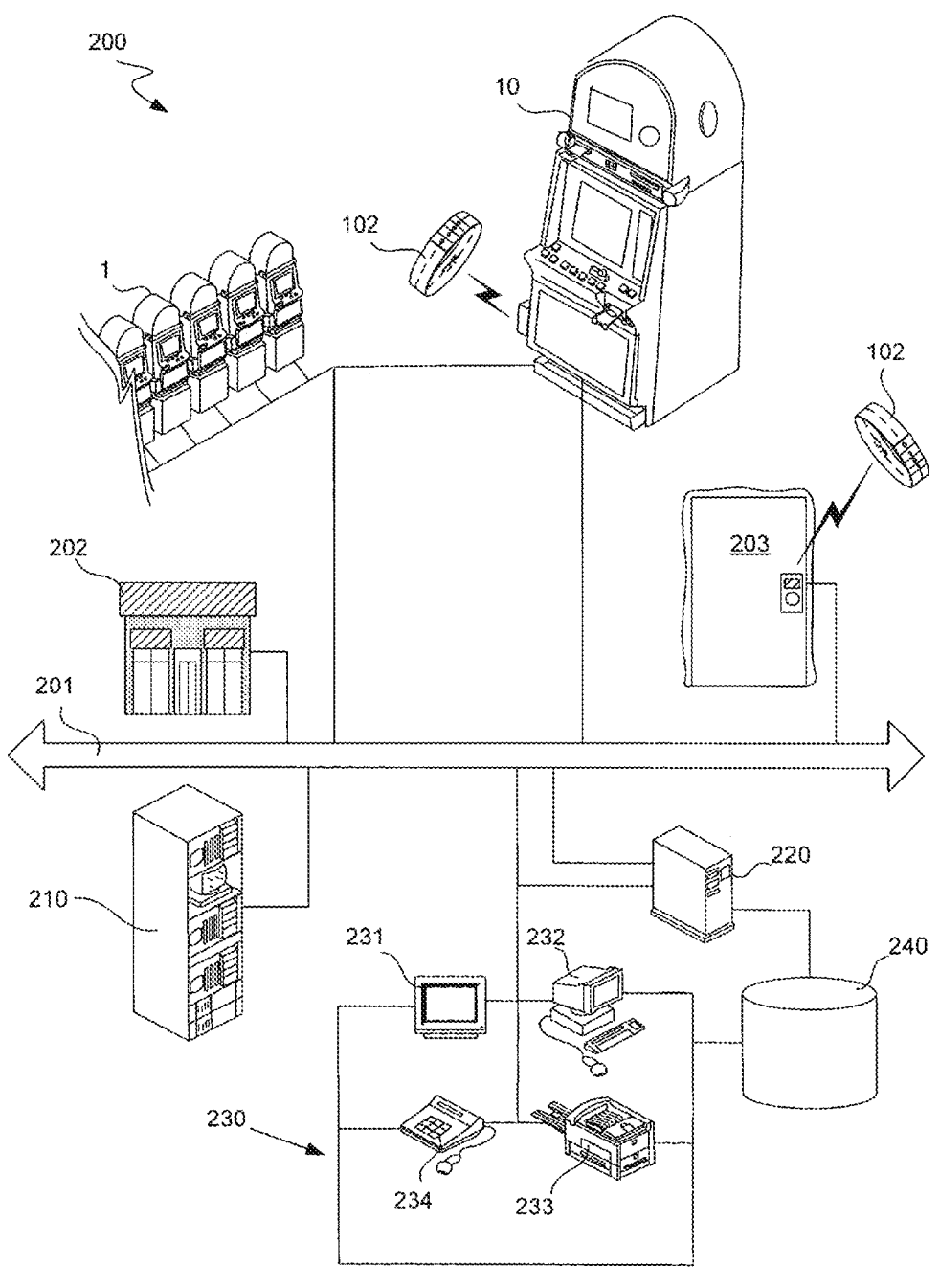
FIG. 4 illustrates a block diagram of an exemplary network infrastructure for providing remote player verification within a remote gaming system of gaming machines and other items according to one embodiment of the present invention.

Turning now to FIG. 4, a block diagram of an exemplary network infrastructure for providing remote player verification within a remote gaming system of gaming machines and other items according to one embodiment of the present invention is illustrated. Remote gaming system 200 comprises one or more remote gaming terminals, a variety of other communication items, and a number of host-side components and devices adapted for use with gaming terminals, remote gaming environments and the inventive remote player verification methods and systems disclosed herein. One or more gaming machines 1 adapted for use in conjunction with remote gaming system 200 and at least one specifically adapted remote gaming terminal 10 can be in a plurality of locations, such as in banks on a casino floor, standing alone at a smaller non-gaming establishment, in isolation and not generally exposed to live in-person play, or in isolation in regions such as individual player hotel rooms (i.e., an iTV system). In addition, one or more other game play devices, retail connections, electronic door locks, game servers, databases, administration tools, and other player and host-side items may also reside within remote gaming system 200, as described in greater detail below.

Remote gaming terminal 10 can be located remotely from a primary casino floor or other monitored gaming environment, and preferably contains at least one player tracking unit, verifier, or reader, such as the RFID tag reader described in greater detail above. Such a player verifier can also be any of a number of different devices not shown here, such as, for example, biometric identification devices such as a fingerprint sensor, a retinal scanner, an image taking or recording device, or a voice recognition hardware device, among others. Various examples of player verification using a biometric identifier are disclosed in commonly assigned and co-pending U.S. patent application Ser. No. 10/244,156, by Rowe, et al., filed Sep. 12, 2002, and entitled "Method and System for Verifying Entitlement to Play a Game Using a Biometric Identifier," which application is incorporated herein in its entirety and for all purposes. Another example of biometric information being used in conjunction with gaming machines and systems is described in commonly assigned and co-pending U.S. patent application Ser. No. 09/491,899, by Wells, et al. filed on Jan. 27, 2000, and entitled "Gaming Terminal and System with Biometric Identification," which application is also incorporated herein in its entirety and for all purposes.

The actual game providing device itself can be any of a number of different devices, such as, for example, a standard or modified gaming machine, a proprietary kiosk, an iTV system, a home or personal computer, or a personal desk assistant (PDA), among others. Such a game providing device can include any number of components, similar to a standard gaming machine, such as, for example, a display unit, one or more speakers or other output unit, a keyboard or other input unit or units, one or more communication units, one or more processors, and/or other electronics and circuitry, as desired. Other associated player accessible items within remote gaming system 200 can include, for example, various retail or restaurant establishments 202, as well as hotel room door locks 203 and other such devices. In the case of a retail or restaurant establishment, an RFID tag reader can be adapted at such a location to read the unique code or identifier carried on an RFID tag securely worn by a registered player, and then credit or debit a monetary or other amount to an account of that player or user as appropriate. For hotel door locks, a simple read and unlocking of the door can be accomplished when the worn RFID tag comes in close proximity to the lock, such as when the player reaches for the doorknob, for example.

Modes of communication between one or more gaming machines 1, remote gaming terminals 10, various retail or restaurant establishments 202, various door or other locks 203 and/or a player verification network can involve, for example, a standard bus, token ring, hard-wired connection directly to the gaming machine or network, direct dial-up connections that can involve CDMA, GSM or other like connections, wireless systems such as a Bluetooth®, Wi-Fi or other type of wireless network, or any form of Internet connection, although other types and forms of communication are also contemplated. As illustrated here, communication line 201 is a standard bus that connects multiple gaming machines, remote gaming terminals and other player usable devices with several host-side player verification network items.

One way to transmit data from the device used as a player identifier to the host-side of the remote gaming system 200 is along a mode of communication that is separate from any mode of communication that might be used to transmit a game or other game play information between the host-side gaming machine or servers and the game-providing device. In the event that such game play information is indeed transmitted from a remote location to a display used by a player, transmitting such information on a communication line separate from any communication line that transmits player verification information is thought to add an additional layer of security to the process. Provisions of separate communication lines or networks can be made through any of the above listed means or methods, or any other suitable communication, as will be readily appreciated by those skilled in the art. While one way of accomplishing this would be to provide separate network addresses and channels for each player verification hardware item, for example, it is thought that the implementation of a separate player verification network would result in a system that is even more foolproof.

In addition to player accessible items such as gaming machines, remote gaming terminals, retail establishments, hotel door locks, and other communication devices, common bus 201 can also connect a number of other networked devices, such as, for example, a general-purpose server 210, one or more special-purpose servers 220, a sub-network of peripheral devices 230, and/or a database 240. Such a general-purpose server 210 may be already present within an establishment for one or more other purposes in lieu of or in addition to remote game playing and player verification. Functions for such a general-purpose server can include, for example, both general and game specific accounting functions, payroll functions, general Internet and e-mail capabilities, switchboard communications, and reservations and other hotel and restaurant operations, as well as other assorted general establishment record keeping and operations. In some instances, remote game play and remote player verification functions may also be associated with or performed by such a general-purpose server. For example, such a server may contain various programs related to general game play operations, remote game play administration and remote game player verification, and may also be linked to one or more gaming machines adapted for remote game play within an establishment, in some cases forming a network that includes all or substantially all of the remote game play capable machines within that establishment. Communications can then be exchanged from each adapted gaming machine to one or more player verification related programs or modules on the general-purpose server.

In a preferred embodiment, remote gaming system 200 comprises one or more special-purpose servers that can be used for various functions relating to the provision of remotely played games and remote player verification. Such special-purpose servers can include, for example, a player verification server 220, a general game server (not shown), a GPS server (not shown), and/or a specialized accounting server (not shown), among others. Such added special-purpose servers are desirable for a variety of reasons, such as, for example, to lessen the burden on an existing general-purpose server or to isolate or wall off some or all remote player verification information from the general-purpose server and thereby limit the possible modes of access to such remote player verification information. Alternatively, remote gaming system 200 can be isolated from any other network within the establishment, such that a general-purpose server 210 is essentially impractical and unnecessary. Under either embodiment of an isolated or shared network, one or more of the special-purpose servers are preferably connected to sub-network 230 of devices. Peripheral devices in this sub-network may include, for example, one or more video displays 231, one or more user terminals 232, one or more printers 233, and one or more other digital input devices 234, such as a card reader or other security identifier, among others. Similarly, under either embodiment of an isolated or shared network, at least the player verification server 220 or another similar component within a general-purpose server 210 also preferably includes a connection to a remote player database or other suitable storage medium, 240.

Database 240 is preferably adapted to store many or all files containing pertinent data or information for players registered with the remote gaming system, with this data or information being particularly relevant to player verification at a remote gaming terminal. Player files and other information on database 240 can be stored for backup purposes, and are preferably accessible to one or more system components, such as a specially adapted gaming machine 10 or remote gaming terminal, a general-purpose server 210, and/or a player verification server 220, as desired. Database 240 is also preferably accessible by one or more of the peripheral devices on sub-network 230 connected to remote player verification server 220, such that information or data specific to given players or transactions that are recorded on the database may be readily retrieved and reviewed at one or more of the peripheral devices, as desired. Although not shown as directly connected to common bus 201, it is also contemplated that such a direct connection can be added if desired. Additional features and characteristics specific to database 150 and the player files therein are provided in greater detail below.

With a preferred remote gaming system, such as the remote gaming system 200 illustrated in FIG. 4 and discussed herein, it is thus possible to provide one or more gaming events at a remote gaming terminal, receive a request by a specific player at the remote gaming terminal to participate in a particular gaming event, obtain information regarding that player, verify that the obtained information is acceptable, according to one or more acceptable criteria, and permit the requested gaming event to commence or continue. In such instances, the remote gaming terminal can be a secondary gaming machine that provides downloadable games or communicates with a primary gaming machine that actually runs gaming events from a central location for various remote gaming terminals. It is also worth noting that while the game being presented at the remote gaming terminal may originate from a single gaming machine, as shown in FIG. 4, it is also possible that such games be run from a game server, such that a wider variety and number of games and options be available at a plurality of remote gaming terminals simultaneously.

In one embodiment, it is specifically contemplated that the obtaining of information from a prospective player occurs either after that player attempts or makes a request to participate in a particular gaming event or during the process of making the specific request. This presumably results in information that is either live or at least very current, such that the use of less reliable or potentially fraudulent older information or data identifiers is reduced. In addition, it is preferable that an authentication or other preliminary identifying step first occur, such that the system is alerted as to which presumably registered player is attempting to access the remote gaming system. In this regard, a player can first enter a player name or handle and an associated password, after which the player verification can be made according to the personal information obtained. Hence, the request to play a specific gaming event can first be associated with a particular registered player and player account before a player verification is made.

It is also preferable that other factors beyond a personal identification also be available for determining whether a given player is authorized to participate in the requested gaming event. For example, it may be desirable to allow some players to play a general slate of slots and table games, but to forbid them from playing high stakes games, such as baccarat. It may also be desirable to set limits on some or all players. For example, a given player may have a gaming loss limit of $1000 per day on the remote gaming system, with an ultimate account balance of $5000 for gaming, restaurant and retail purchases combined, whereupon the realization of either limit results in further play or purchases for that player being terminated or restricted until an appropriate payment or other resolution is made. Such limits may be sent as part of a loss prevention program to protect the interests of a casino or gaming operator, as part of a gaming harm minimization or other similar type program to protect individual players, or a combination of both. Other issues may involve security problems, or a recorded history of a given individual engaging in problematic activity, such as attempting to defraud the system or hand off control to an underage or otherwise unauthorized player. Such acts may result in the desire to further limit or ban an otherwise positively identified registered player.

In another embodiment of the present invention, the information obtained from the prospective or current player being verified can also be information regarding the actual current geographic location of that specific player. This can be determined by, for example, a global positioning system that is adapted to determine player position and communicate that information independently on a separate mode of communication. Inclusion of this type of personal information can assist greatly in the prevention or reduction of remote gaming sessions from jurisdictions where gaming is illegal or restricted. In such an instance, the worn communication item may also comprise a small GPS device, and a GPS server or other similar hardware item can be specifically adapted to note the geographic location of a purported player, and then either permit that player to play all games, restrict that player from all games, or permit certain games and/or betting limits or actions, as allowed by the jurisdiction where that player is currently located.

Although many types of GPS units are possible for use with the present system, it is specifically contemplated that the GPS units capable of being adapted to work in association with RFID tags and their uses be used with the inventive methods and systems provided herein. By utilizing the GPS features present in an RFID tag system, the combination of verifying both a player identity and specific location can be accomplished. In this manner, both this and the previous preferred embodiment can be practiced at the same time, with the advantages inherent to each embodiment being simultaneously realized. This can be particularly useful in the event of mobile gaming terminals or devices, such as PDAs or home computers. Other uses of such a combination system will be readily apparent to those skilled in the art.

In yet another embodiment of the present invention, it is specifically contemplated that the steps of obtaining and verifying player information, and permitting a given remote gaming event or session to continue are repeated even after the gaming event or session has already been allowed to commence for a given player. Of course, such a preferred embodiment may be used in combination with one or more of the previously discussed preferred embodiments, resulting in an even better method or system. The repetition of these steps is particularly useful in preventing or at least limiting the ability of a legitimate player to hand off control of the remote gaming terminal to an underage or otherwise unauthorized player. The repetition of these steps can result in a particular gaming event or session being terminated if it is determined that an inappropriate use or activity has occurred or is in the process of taking place. In this manner, it can be said that ongoing monitoring of the remote gaming terminal is essentially taking place.

While the repeated verification of a player can take place at regularly timed intervals, such as every 5 to 10 minutes, for example, it is thought that re-verification at random intervals can result in stricter adherence to proper play by the registered player, as it would then be unknown as to when a re-verification might occur next or is presently occurring. Alternatively, it is possible that the repetition of obtaining personal information and verifying the player can be continuous. For example, it can be required that a player simply keep his or her securely worn communication object or device within reading range of the player tracking device adapted to read player specific information. In the event that such a device is a relatively high-powered RFID reading unit, then such a requirement will not tend to be an issue. Of course, requiring the player to place his or her RFID device in close proximity to the reader on occasion for verification purposes may also be desirable, in addition to the use of securely encrypted verification keys for devices and readers.

Figure 5:
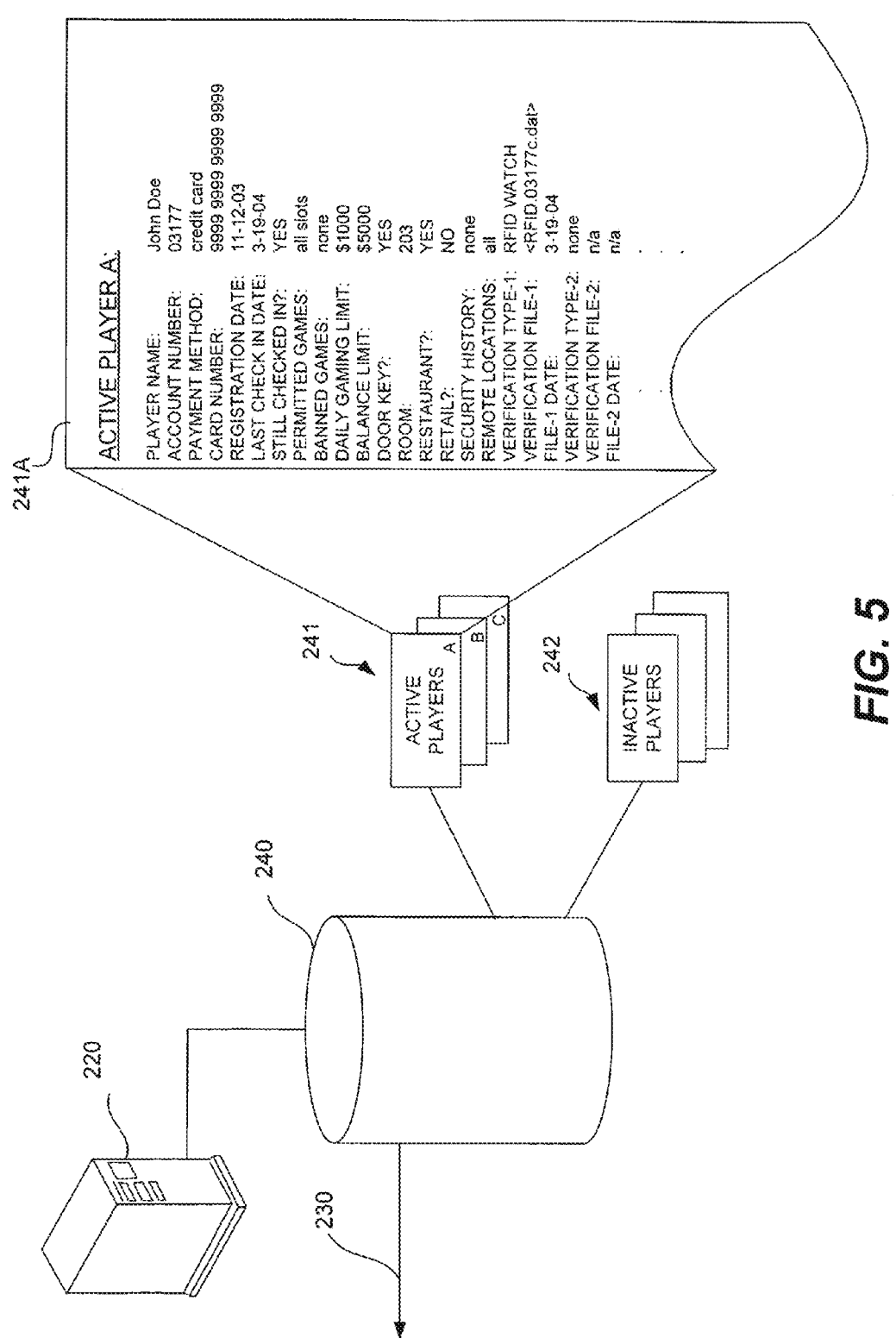
FIG. 5 illustrates an exemplary database containing associated data identifiers of various registered active and inactive players according to one embodiment of the present invention.

Continuing on to FIG. 5, an exemplary database containing associated data identifiers of various registered active and inactive players according to one embodiment of the present invention is illustrated. As similarly illustrated in FIG. 4, database 240 is accessible to one or more servers, preferably including at least remote player verification server 220. Database 240 also preferably has a connection to a sub-network 230 of one or more peripheral devices. Contained within database 240 are numerous files or data sets with respect to many different past and present active and inactive players within the remote gaming system, and preferably files for all such players are contained within database 240 or a collection of related databases. Such files or data sets can be classified according to presently active player files 241 and presently inactive files 242, with such inactive player files possibly including files for unregistered players, banned players, known or suspected cheats or thieves, and/or otherwise unauthorized or untrustworthy players. Although not necessary, the existence and maintenance of banned player files can help to track improper or illegal attempts by unauthorized, underage, or other undesirable players to play at a remote gaming terminal, and thus aid in the denial of gaming activities to such individuals and/or reporting of such attempts. It is also possible that inactive player files include the files of players who are not currently active within the remote player verification system, such that any attempt to circumvent the check in process and use player data or a player identifier can be more readily detected by the system.

Each file or data set 241, 242 preferably contains information regarding the identity, status, and any pertinent restrictions with respect to past and present active and inactive players, with database 240 preferably being adapted to store updated player information for each player over time as such information changes and/or as players access the remote gaming system in the future. Parameters for storing player information can vary widely and are left up to the discretion of the system administrators. As shown in the illustrated example for established player file 241A, such information can include information for the player such as, for example, a player name, account number, payment method, payment identifier, registration date, last check in date, checked in status, permitted game types, banned game types, daily gaming loss limit, cumulative balance limit, activations for associated door keys, hotel room number, activations for associated restaurants, activations for associated retail units or establishments, security history, permitted remote locations, and one or more player verification types, files, and established dates among others. Of course, other possible player informational items can be stored, and not every exemplary item listed here is necessary. In addition to containing data on any unique RFID bracelet currently worn by a given player, these player verification files can also include one or more forms of biometric information for the player, such as fingerprint or retinal data, a voice recording, a visual image, or a short movie clip, among others.

Such information is preferably stored within a player file within the database, and can be retrieved and utilized by a remote player verification server 220 and/or a player verification program on another system server or actual gaming machine, if applicable, in order to determine not only whether the identity of a potential player is correct as claimed, but also whether that player is established and authorized at a particular remote location, for the requested game, and/or at the requested betting levels, among other factors. In the event that an established player defaults on a payment, accesses the remote gaming system from an improper location, attempts to aid in the access of an underage or otherwise unauthorized player, or acts in other ways deemed to be improper, then the file for such a player be appropriately updated by a system administrator to reflect such information, add restrictions, or alternatively reclassify the file as a banned player file. In such cases, RFID identifiers, player information and biometric or other verification file types can be maintained within the database in order to utilize such information in the event that unauthorized access may be attempted at some point in the future by that individual.

According to one embodiment of the present invention, the provided method or system, which preferably includes a network or like structure, involves the ongoing recordation of data or information as players repeatedly access the remote gaming system for ordinary remote game play. Such live data capture can be used immediately in the event that an alarm or alert needs to be triggered due to an improper access attempt or gaming behavior, and can also be stored in one or more databases, such as the database described above. In the event that one or more alarms or alerts are to be triggered in conjunction with use of the present remote player verification system, it is preferable that this system be at least somewhat intertwined with one or more elements of a security system or general law enforcement, such that action might be taken at the remote gaming terminal, if possible, with the recordation of data advantageously providing evidence of the illegal or improper activity.

Figure 6:
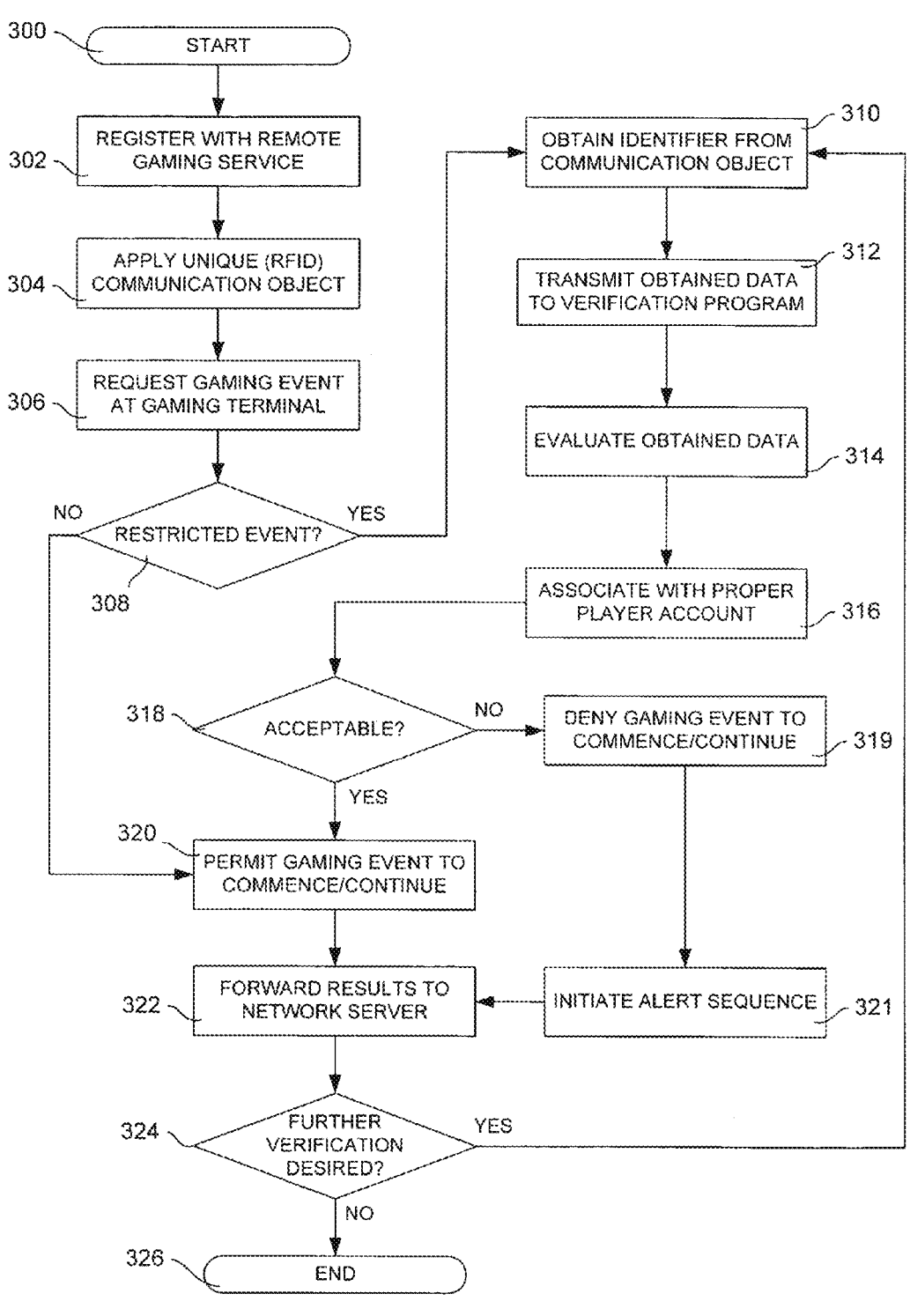
FIG. 6 illustrates a flowchart of one method of providing remote gaming and remote player verification according to one embodiment of the present invention.

Referring now to FIG. 6, a flowchart of one method of providing remote gaming and remote player verification according to one embodiment of the present invention is presented. After a start step 300, a first process step 302 involves a player registering with the remote gaming service. This can involve, for example, an added procedure upon making a hotel reservation or checking in at a hotel or may simply involve a player signing up at a front desk or cashier window of a casino, among other processes. Such a registration step preferably includes establishing a player account for a specific player, which might include a manual check by system administration personnel of an item of player identification, such as a driver's license, and the establishment on a file record of a payment slip or method, such as a credit card number or cancelled bank check. A check-in under a previously established player account might also be considered as registering with the remote gaming service. After a successful registration at process step 302, a subsequent step of applying a unique communication object takes place at a process step 304. Such an object is preferably an object with an embedded or otherwise associated RFID tag, such as any of the specific examples disclosed in greater detail above. This object can be unique in many different ways and is preferably unique at least with respect to a unique code or identifier contained within the embedded RFID tag. As discussed previously, such an application step preferably involves a verified placement of the communication object on the player as a worn article, along with an activation of a closed electrical circuit within the object and associated with the RFID tag. It is preferable that activation or initialization of such an RFID device only be possible once the device is in place and worn by the user, such that theft and misuse of pre-configured or easily activated devices is minimized or rendered impossible. Further, it is preferable that only authorized personnel at an appropriate issuance and activation location can administer, configure, and activate a worn RFID device, to similarly reduce or eliminate the chances for fraud or misuse.

Once the unique communication object is securely worn by the assigned player and its embedded RFID tag and circuit have been activated, the player is then free to utilize the worn object in conjunction with some or all of the items within a provided remote gaming system. As discussed above, such items can include hotel door locks, registers at restaurants, retail outlets, cafes, and bars, as well as other similar items, but in any event preferably includes the use of one or more gaming terminals, and in particular remote gaming terminals. Such remote gaming terminals can include, for example, regulated kiosks, isolated gaming machines away from a casino floor, personal computers, and hotel room gaming systems, among others. Of course, use of the disclosed RFID system in connection with gaming machines on a casino floor is also contemplated, particularly where functions beyond a simple supervisory verification of player eligibility to participate in a gaming event are utilized. At a subsequent process step 306, the player requests or attempts to play in a gaming event at a particular gaming terminal. Again, such a gaming terminal can be any gaming location at or remote from a casino floor or location. For remote gaming terminals, such a request or attempt can involve, for example, accessing or turning on a remote gaming device in a hotel iTV unit, requesting a remotely downloadable game at a secondary gaming machine or kiosk, or accessing a remote gaming program from a personal computer or PDA, among others.

A subsequent decision step 308 then involves a decision as to whether an attempted or requested gaming event or channel is restricted. While restricted gaming events or channels can generally include all games involving a player wager, non-restricted events and channels can include, for example, those involving suitable recreational video games, such as in the instance of a hotel room iTV unit. If such an attempted or requested gaming event or channel is deemed to be restricted, then the player verification method proceeds to a process step 310. Should the gaming event or channel be non-restricted, however, then the charted method becomes relatively simple, as the method proceeds to a process step 320, where the requested gaming event or channel can be accessed, with the requested gaming event commencing as requested. Results could then be forwarded to the gaming network at a process step 322, if necessary or desired, and presumably no further verification would be needed or desired at decision step 324. The process would then end at end step 326.

Should the requested channel or gaming event be restricted, then player verification is necessary, such that a player identifier is obtained from the player worn communication object at a process step 310. The player can thus be prompted or otherwise required to authenticate himself or herself via the unique RFID tag worn in close proximity to the player, preferably in a securely worn bracelet, wristwatch or other secured device, as described above. In one embodiment, such a data obtaining step can happen in an automated fashion, as a player tracking unit in or connected to the gaming terminal can read the RFID tag embedded within the communication object worn by the player without any action required on behalf of the player. In other embodiments, the player may be prompted to place the worn communication object in close proximity to the player tracking device adapted to read the RFID tag therein, such as by placing a wristwatch, for example, next to the reader. Other player prompts may include a manual input or other verification regarding the identity of the player, particularly where an individual player account is accessed.

At a subsequent process step 312, this obtained data is then transmitted to a player verification program at a remote gaming service, remote host, or within the remote terminal itself, depending upon the particular application. At the next process step 314, the obtained information or data is then evaluated by the player verification program, which evaluation can involve the reading and interpretation of part, or all of the code or data identifier submitted by the RFID tag embedded in the device worn by the player. Based upon this reading and interpretation of information communicated by the RFID device, an association with a particular proper player account can be made at a following process step 316. A file for this player account can reside on an associated system database, and information from this player account can then be used by the evaluating program or programs as part of the following decision step. In simplified embodiments where only minimal player eligibility verification is desired, then this association process step 316 may be eliminated.

At the following decision step 318 it is determined whether the data obtained from the prospective player is verified as acceptable. Such a verification may be relatively crude, in that only underage gaming is targeted, or may be refined, in that a determination is made as to the actual identity of the prospective player. Such an identity determination is desirable in the event that access to player accounts is a feature of an implemented method and system. In particular, decision step 318 should involve a decision or determination as to whether the integrity of the closed circuit associated with the RFID communication object has been compromised. In the event that this circuit has been broken, such as during the removal of a bracelet or wristwatch, then either no data will be sent, or data indicating that a denial or "NO" decision is in order should be communicated from the RFID tag. Should the decision be that the data collected from this person is acceptable, then the gaming event is permitted to commence at a subsequent process step 320. In such a case, results of the gaming event are then subsequently forwarded to the appropriate network server, such as an accounting server at the next process step 322, and a decision step as to whether further player verification is desired is arrived at a subsequent decision step 324. Should further player verification be desired, then process steps 310 through 324 are repeated as necessary, with the method terminating at an end step 326 if further player verification is not desired.

In the event that the evaluation of data obtained from the player or prospective player results in an unacceptable player verification at decision step 318, however, then the method proceeds to a process step 319, where a denial of the requested gaming event from commencing or continuing occurs. As discussed above, such a decision is especially appropriate where the integrity of the communication object has been compromised, such as by any break of the closed electrical circuit contained therein. At a subsequent process step 321 an appropriate alert sequence can be initiated, whereby an alarm may sound, and the automated denial and any pertinent information or data can be forwarded, depending upon the nature and severity of the infraction. Appropriate gaming operator, security and/or law enforcement personnel can also be notified at this stage, if desired. The method then returns to the primary process branch at process step 322, where such results are then forwarded to the appropriate network server for recording and/or additional processing.

It is worth noting that additional factors beyond the verification of RFID information can be involved at the "acceptable?" decision step 318. Such additional factors can include, for example, whether the player is banned or restricted from playing certain games or denominations, whether the player has exceeded a daily loss limit or maximum balance limit, or whether the player is the subject of any security inquiries or other potential problems. Additional factors may likewise be added here as desired for any particular remote gaming operator. In any such case, it may be possible that the response to the decision step 318 is a "NO," even where the integrity of the communication device is not indicated to have been compromised, and/or the identity of the player has been otherwise properly verified.

Of course, one or more of the foregoing steps may be similarly undertaken in the event that the system is used for a non-gaming event, such as to pay for a retail purchase or restaurant tab, or to open a hotel room door. In such cases it can also be important to be able to obtain identifying code or data from an RFID tag embedded in a communication object applied to (i.e., worn by) a registered player, to evaluate this obtained data, associate it with a proper player account, make a decision as to whether the data is acceptable, and permit an event or check out to occur. Other similarly convenient applications of the foregoing system may also be implemented as desired by a gaming operator or other operating entity with an interest in securely and conveniently identifying individuals within a given system in a reliable manner.

Of course, it is also possible that a network not be implemented in the case of a worn RFID device player authentication system. In fact, even a server or set of servers need not be used, as a simple system with one or more device issuing locations and one or more device reading and authentication units at appropriate gaming or other authentication locations can be used. In such simplified systems, the process of verifying player identities and issuing worn RFID devices would likely be similar to the process used in a networked system. However, the actual reading and authenticating units at the authentication locations would simply read worn devices and authenticate use or nonuse of a gaming device or other such item without using a network, server, or other centralized device to assist in the process. Such simpler systems might be implemented where overall cost is a concern, yet an establishment still would like to be able to authenticate players or users for particular gaming machines or other items automatically. For example, where remote and unsupervised banks of gaming machines might attract underage users, only users wearing an RFID device would be able to play such machines.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Certain changes and modifications may be practiced, and it is understood that the invention is not to be limited by the foregoing details, but rather is to be defined by the scope of the appended claims.

The Point of Patterns

In various embodiments, a bracelet with an RFID tag, such as bracelet 100, or 103, may also feature various patterns, designs, logos, color schemes, or other visual schemes. Patterns may serve a number of functions, in various embodiments. A pattern may be ornamental. Thus, for example, patterns on a bracelet may be designed for visual appeal so that a player will be willing or eager to wear a bracelet.

A pattern may indicate a player status. For example, a bracelet of first color may indicate that a player is a high-roller, while a bracelet of a second color may indicate that a player is not a high-roller. A status of a player may also include privileges held by the player. For example, a player of a first status may be granted access to areas that are off-limits to other players. In various embodiments, the color of a bracelet may indicate the age of a player, or an age range of the player. For example, the bracelet may allow a determination to be made as to whether a player is of age to play gambling games, to enter certain clubs, to obtain senior citizen discounts, or to engage in any other age-dependent activity.

In various embodiments, the color of a bracelet may indicate the relationship of the player with a casino. A bracelet color may indicate that a player has been a long-time patron of a casino. For example, a bracelet of a first color may indicate that a player has made more than 20 visits to a casino over a two-year period. A bracelet of a second color may indicate that a player has not made that many visits over the same period.

A bracelet color may indicate certain privileges of a player. A bracelet color may indicate that a player has the privilege to enter a certain club, visit a certain restaurant, visit a certain lounge, visit a certain gaming room (e.g., a high-roller room), or visit any other area. A privilege of a player may include preferential access to a restaurant, the-ater, or other location. A privilege may include entering a restaurant before others waiting in line, getting special seating at a theater (e.g., getting front row seating), sitting at a special table in a restaurant, or any other privilege.

A bracelet color may indicate a disability status of a player. For example, a player with a certain color bracelet may be granted priority seating at a gaming device with wheel chair access.

According to various embodiments, a first player may be given a bracelet of a first color to indicate a first status of the first player, and a second player may be given a second bracelet of a second color to indicate a second status of the second player, where the first color is different from the second color, and where the first status is different from the second status.

As will be appreciated, status may be conveyed through different patterns printed on a bracelet, through different designs, through different materials, through different weav-ing patterns, or through any other visually distinct schemes.

Advertisements

In various embodiments, advertisements may be printed on a bracelet. In various embodiments, any promotion may be printed on a bracelet, such as an indication of 20% off on some product, a political campaign slogan, or any other promotion. In various embodiments, a marketer may pay for the privilege of placing promotions on bracelets. A marketer may pay according to various protocols. A marketer may pay a fixed price per bracelet, per hundred bracelets, or per any other quantity of bracelets. In various embodiments, a marketer may pay per time that a bracelet with his promotion is handed to a player. Thus, for example, a marketer may pay $X per bracelet. In various embodiments, a marketer may pay according to how long a bracelet was in the possession of a player or players. For example, a marketer may pay $X per hour in which a bracelet is in the possession of a player. Presumably, the longer a bracelet is in the possession of a player, the more exposure the marketer's promotion receives.

In various embodiments, a marketer may pay according to the way gaming proceeds while a bracelet is worn. A marketer may pay $X per Y amount wagered while a bracelet is worn. A marketer may pay $X per Y amount won, $X per Y amount lost, $X per Y gross amount won, $X per Y gross amount lost, $X per Y games played, or according to any other measure. Using one or more of the above schemes, a marketer may tend to pay more as more amounts are wagered when a bracelet is worn. The marketer may thus pay a premium for promoting to wealthy players or to players with a lot of money to spend.

In various embodiments, a marketer may pay based on where bracelets are given out. A marketer may pay $X per bracelet for bracelets given out in a first casino, but $Y per bracelet for bracelets given out in a second casino. For example, a marketer may be willing to pay more to have his promotions on bracelets in a casino with typically wealthy clientele than in casinos with typical clientele of average income.

In various embodiments, as described herein, an electrical circuit may be tripped or broken and may thereby indicate when a bracelet is no longer being worn, and/or when a bracelet is no longer active. The tripping or breaking of an electrical circuit may thus mark a time which may be used to determine how much a marketer should pay to have his promotion on a bracelet. For example, a marketer may pay $0.50 per hour that a bracelet is worn, and that the bracelet permits gaming by the wearer. When the bracelet is taken off and the electrical circuit is broken, the marketer may stop paying. In various embodiments, the time when the circuit is broken is marked. A charge for a marketer is then computed based on the time the bracelet was broken, based on the time the bracelet was first put on, and based on the hourly rate for wearing the bracelet.

In various embodiments, a marketer may pay to have promotions on a bracelet based on the gaming history of the player wearing the bracelet. For example, the greater the lifetime amount wagered by the player wearing the bracelet, the more a marketer might pay. In various embodiments, the marketer may pay for putting promotions on bracelets based on any demographic characteristic of a player. For example, a marketer may pay based on an age, occupation, place of residence, income level, or any other demographic.

In various embodiments a player may be offered a bracelet with a promotion printed on it. The player may decline to wear the bracelet. The player may then receive a bracelet without a promotion. In various embodiments, the player may be offered a bracelet with a new promotion.

In various embodiments, a player may be paid to wear a bracelet with a promotion on it. The payment may come directly or indirectly from a marketer. For example, marketer may pay the casino $1.00 per hour the bracelet is worn. The player may receive from the casino $0.50 per hour the bracelet is worn.

In various embodiments, bracelets with certain printed promotions may grant the player certain privileges. A bracelet with a logo or color scheme of a restaurant may gain priority entry for a player into the restaurant (e.g., the player may be able to enter without reservations; e.g., the player may be able to get in before others who came first).

Bracelets that Match Clothes

In various embodiments, a player may be offered a bracelet based on the color, design, or other feature of an item of clothing the player is wearing. For example, if a player is wearing an orange blouse, the player may be offered an orange bracelet. In various embodiments, a player may be asked what bracelet he/she wants. The player may be given the bracelet with the color, pattern, or other scheme that the player has asked for.

Bracelet with Identifier

A bracelet may include a printed identifier, such as a printed numerical identifier, bar code, or a printed name of a player. The printed identifier may be used by a restaurant or other merchant to grant the player special privileges, such as priority entry. In various embodiments, a player may use the identifier printed on his bracelet to pay. For example, the identifier may be linked to a financial account (e.g., to a room bill; e.g., to a credit card account). In various embodiments, the player need only show the bracelet to a merchant in order to pay for an item. The merchant need not necessarily use an RFID reader to read the RFID tag in the bracelet. In various embodiments, the identifier may be representative of a player status.

Logos on a Bracelet

In various embodiments, a bracelet may have printed on it one or more logos. In various embodiments, a bracelet has a logo of a casino printed on it. The logo may be a logo of the casino which is giving out the bracelet. In various embodiments, the bracelet may have printed the logo of a technology provider for a gaming system. For example, if a bracelet is used to enable access to a mobile gaming device (e.g., a portable or handheld gaming device), the bracelet may have printed on it the logo of the manufacturer of the mobile gaming device. In addition to, or instead of logos, names of companies may be printed, in various embodiments. For example, a bracelet may have printed on it the name of a casino or technology provider.

Battery Indicator

In various embodiments, a bracelet may include a battery indicatory. The indicator may show when the battery or other power source of the bracelet is near depletion. In various embodiments, bracelets may not be given out if their batteries are in a certain state of depletion or more (e.g., if there is less than two hours battery life left on the bracelet's battery). In various embodiments, when a player returns a bracelet, the battery in the bracelet may be recharged before the bracelet is given out again to another player.

Sterilization

In various embodiments, a bracelet may be sterilized or otherwise cleansed between when it is returned by one player and when it is given out to another player. For example, a bracelet may be heated or treated with alcohol in order to disinfect the bracelet. In various embodiments, a sterilization process may alleviate concerns about wearing something that someone else has already worn.

How to Make the Designs

In various embodiments, images, logos, colors, patterns, or other designs may be placed on a bracelet using screen-printing, serigraphy, and silkscreening technologies. In various embodiments, designs may be printed onto a bracelet using any other technology. In various embodiments, designs may be created by fashioning the bracelet out of materials with particular colors. For example, a black bracelet may be created using a black material. In various embodiments, designs may be woven into a bracelet (e.g., if the bracelet is s cloth material). In various embodiments, designs may be etched or burnt into a bracelet (e.g., if a bracelet is a plastic material).

Other Things that Happen Continuously Until the Bracelet is Taken Off

In various embodiments, a player may continue to receive entries into a drawing so long as he is wearing a bracelet. For example, a drawing for a $1 million prize may be held at the end of each day. The drawing may consist of 6 randomly chosen numbers. To win the prize, a player with an entry must match the 6 randomly chosen numbers with his own entry of 6 numbers. In various embodiments, a player may receive an additional slate of 6 numbers as an entry into the drawing for each minute that he wears a bracelet with an RFID tag. This may encourage the player to continue to wear the bracelet. It may also encourage the player to continue gaming since gaming may be permissible for the player when he is wearing the bracelet.

In various embodiments, a player may receive comp points just for wearing a bracelet. For example, the player may receive one comp point per minute in which he is wearing his bracelet.

Instructions for Giving Out the Bracelet

In some embodiments, a casino may put in place processes for giving out communications objects. Processes may include processes for determining which of two or more types of communications objects a customer will receive. Processes may include processes for determining which of two or more patterns, colors, or designs will appear on a communications object. Processes may include processes for determining a hardware component that will be included in the communication object given to a player. For example, in some cases, an RFID tag may be included, while in other cases, another type of signaling device may be included. Processes may include processes for determining a signal that should be emitted from a communications object. For example, a first signal may grant a player with the communications object a first set of privileges, while a second signal may grand the player a second set of privileges.

A decision to give out a particular communications object, or a communications object under a particular configuration, may be made in various ways. In various embodiments, the decision may be made by a program. The program may reside on a casino device, such as on a casino server or such as on a computer terminal at a location where communications objects are given out to players. In some embodiments, a decision may be made by a casino employee. A casino employee may act according to predetermined instructions. Thus, the casino employee's actions may be in accordance with a well-defined process for giving out bracelets.

The decision maker, be it a human, program, or other entity, may have access to various information. Such information may include information about a player's gaming history, information about which communications objects are currently available to be given out, which communications objects have been given out, how given out communications objects have been programmed or configured (e.g., what signals such communications objects have given out), information about what privileges are available to be conferred by giving out communications objects (e.g., what restaurants have special tables that can be reserved for players with particular communications objects), information about what communications objects have been discarded or destroyed, and any other type of information.

Which of Two or More Types of Communications Objects

In various embodiments, a communications object may be given out based on a player status. A player's status may be based on the profitability of the player to the casino giving out communications objects. Thus, the player's status may be linked to direct or indirect measures of a player's profitability, such as how frequently the player has visited a casino, how much the player has gambled at the casino, how much money the player has spent at the casino, how many total nights the player has spent at the casino, how many friends the player has brought to the casino, how much the player has lost at the casino, and so on. A player with high profitability may be given a communications object signifying a first status. A player with lower profitability may be given a communications object signifying a second status. For example, a given threshold, designated in terms of profitability per unit time, may divide players of a first status from players of a second status. There may be many status levels or tiers. For example, there may be status levels corresponding to very profitable players (i.e., profitable for the casino), status levels corresponding to moderately profitable players, and status levels corresponding to minimally profitable players.

A player's status may be conveyed visually. The design, structure, or pattern of the communications object may correspond to a player's status, and thus may convey the player's status. For example, an RFID bracelet colored blue may correspond to a first status, while an RFID bracelet colored red may correspond to a second status. Status may also be conveyed through patterns. For example, a striped wristband on a bracelet may correspond to one status, while a solid color wristband on a bracelet may correspond to another status.

Thus, in various embodiments, depending on a player's status, a first patterned communications object may be given to the player, or a second patterned communications object may be given to the player. For example, the player may receive either a blue bracelet or a red bracelet depending on his status.

In some embodiments, a status may be conveyed electronically. A communications device may broadcast a signal indicative of a player status. For example, a communications device may broadcast a sequence of bits that is recognized by a point-of-sale terminal in a restaurant. The point-of-sale terminal may recognize the sequence of bits as entitling the wearer of the communications object to be seated before others who have come before him.

In some embodiments, a first communications object which broadcasts a first signal may be given out to a first player with a first status, while a second communications object which broadcasts a second signal may be given out to a second player with a second status.

In some embodiments, a status may be purely symbolic. For example, wearing a bracelet that shows a player to be of high status may make the player feel important, however it may otherwise not grant the player any special privileges.

In some embodiments, status may grant a player special privileges. A status may grant a player discounts or other promotions at one or more merchants, priority access to restaurants, access to special tables at restaurants, access to special menu items, access to special seats for a show, access to special rooms in a casino, and so on.

In various embodiments, first type of communications object may be chosen to be given to a player over a second type of communications object based on the number of each type remaining in inventory. For example, if a casino or casino desk has 100 communication objects with red wristbands remaining, but only 10 communication objects with blue wristbands remaining, the casino may decide (e.g., a program run on a casino server may decide) to give out a communications object with a red wristband to the next player who needs a communications object. If the player then specifically requests a communications object with the blue wristband, the requested communications object may be provided instead. However, the red one may be provided initially. Thus, in some embodiments, a type of communications object for which there are a greater number remaining may be given to a player as a default.

Programming the Bracelet

In some embodiments, a communications object may be programmed or configured before or after it is applied. A communications object may be configured, for example, to emit a first type of signal indicative of a first player status. A communications object may, for example, be alternatively configured to emit a second type of signal indicative of a player status. Thus, before a communications object is applied, it may be configured to emit a signal corresponding to a player's status. In some embodiments, a communications object may be configured after it is applied. A communications object may be configured to emit a signal which conveys any desired information. For example, a communications object may be configured to emit a signal indicative of a player's name or other player identifying information. A communications object may be configured to emit a signal indicating that an associated circuit is closed or that an associated circuit has been broken.

When a player receives a communications object, either before or after the communications object is applied, the player may be asked about various intentions or preferences of the player. The player may be asked: (a) what type of food he likes; (b) what type of restaurants he likes; (c) what restaurants he would like to eat at; (d) whether he likes buffets; (e) whether he likes shows; (f) what types of shows he likes; (g) what type of foods or drinks he likes to have delivered to him; (h) what types of games he likes; (i) what gaming machines he likes; (j) what areas of a casino he likes; (k) what types of products he would like to buy; (l) what merchants he plans to spend at; (m) how many days he is staying; (n) how much he would like to spend on one or more items or activities; and any other information about intentions or preferences.

A player may indicate his preferences to a casino. For example, a player may fill out a survey at a casino terminal or may verbally indicate preferences or intentions to a casino representative, who may then fill in a form for the casino. Once a player's preferences or intentions are known, a player's communications object may be configured so as to make it easier for the player to fulfill his intentions, so as to provide the player with a benefit for pursuing his preferences (e.g., for visiting a preferred restaurant) or for pursuing his intentions. A player's communications object may be configured to emit a signal which grants the player a privilege at a preferred location. For example, the signal may allow a player to bypass a line for a preferred restaurant, to get a discount at a preferred restaurant, to get a discount at a preferred merchant, to get tickets to a preferred sold-out show, to receive extra comp points at a preferred game, to visit a preferred merchant after business hours, to receive a preferred drink delivered hourly at his gaming device, or to receive any other benefit or privilege. Thus, a player may be motivated to receive and wear a bracelet because the bracelet may grant the player privileges. Further, the player may be motivated to disclose intentions so as to receive benefits for fulfilling the intentions. A merchant may be willing to grant to the player privileges just so that the player may be more likely to visit the merchant. Thus, a restaurant device (e.g., a point-of-sale terminal) may readily accept signals from a communications object of a player and thereby allow the player to bypass a line. In some embodiments, when a player's communications object is configured to emit a particular signal, one or more merchants, casino devices, or other parties may be informed of the particular signal (e.g., the bit sequence of the particular signal), and may be informed of the privileges the signal is supposed to signify. Upon receiving the signal from a communications object of a proximate player, a merchant may then actually be willing to provide such privileges.

In various embodiments, merchants, retailers, or other parties may specify one or more privileges they are willing to give out. The merchants, retailers, or other parties may further specify a quantity of such benefits that may be given out. The merchants, retailers, or other parties may further specify characteristics of players that are to receive such benefits. For example, a merchant may specify that he wishes for ten 2-for-1 specials on all items for sale to be given out to any player who is 70 years of age or over. Where a merchant has specified a limited quantity of a benefit to dispense, the casino may track how many of such benefits have already been dispensed and/or how many are still available to be dispensed. The casino may ask players for various information in order to determine whether such players are eligible for benefits from a merchant, retailer, or other entity. If a player is eligible, then the player's communication object.

In some embodiments, a player may provide a security deposit when receiving a communications object. The player may lose all or a portion of the security deposit if he fails to return the communications object. The player may lose all or a portion of the security deposit if he fails to return the communications object by a certain specified time, such as by the end of the day on which he received the communications object. The player may lose all or a portion of the security deposit if he fails to return the communications object within a predetermined amount of time after the circuit in the communications object has been broken (e.g., after the bracelet has been opened). Taking away a security deposit or otherwise applying a fee or penalty may discourage players from transferring communications objects to other players, and thereby grant the other players unwarranted benefits.

Which of Two or More Hardware Configuration Will be Given Out

In various embodiments, when a player is to be provided with a communications object, it may be decided which of two or more hardware configurations of communication object the player will be given. For example, a first communications object may include an active transmitter, while a second communications object may include a passive RFID tag. In some embodiments, communications objects of different configurations may be given out depending on the stated intentions of a player. If a player intends to use a mobile gaming device in areas that are far from RFID detectors (e.g., on a casino golf course), the player may be provided with a bracelet with an active transmitter so as to be able to broadcast a signal to more distant receivers. If a player intends to use a mobile gaming device within the vicinity of RFID tag readers, the player may be provided with a bracelet with an RFID tag. If a player intends to go swimming, the player may be given a bracelet with a water resistant coating around the electronics of the bracelet. If the player does not intend to go swimming, a bracelet without water resistant coating may be given to a player.

The gaming history of a player may include outcomes, results, and other events that have occurred in a player's games in the past. The gaming history of a player may include information about the following:

The last outcome achieved

The last X outcomes achieved

Any games, events, results, or outcomes that have occurred in the last hour.

Any games, events, results, or outcomes that have occurred in the X period of time Any games, events, results, or outcomes that have occurred in a player's trip, including any aggregate results of the player's trip (e.g., total winnings for the trip)

The player's gross winnings

The player's net winnings

Outcomes, net winnings, gross winnings, or any other statistic achieved over the player's lifetime An amount of a buy in (e.g., an amount of money initially brought to a table by a player)

An amount of a cash out (e.g., an amount of a money with which a player leaves a gaming device, gaming table or gaming session)

Jackpots won by the player

The largest payouts received

Current credit balance

Amounts wagered per game

Which games were played

Playing strategies

Number of pay-lines

Rate of play

Number of games played

Number of games played in last X period of time

Preferred gaming device

Gaming device that gave the player the most favorable results

Game opponents

Dealers played against

Comps awarded

The invention claimed is:

1. A gaming player verification system for use in conjunction with one or more gaming machines adapted for accepting wagers, presenting gaming events thereupon and granting monetary awards, the gaming player verification system comprising:

one or more communication objects worn by players within said gaming player verification system, wherein at least one of said one or more communication objects comprises an RFID tag, a pressure sensor or a moisture detector, and an associated closed electrical circuit, that communicates via radio frequency waves, and alters its communication pattern in response to a change in pressure or moisture indicative of removal from a player;

one or more player tracking devices that obtain information regarding a specific player from one or more of said one or more communication objects, wherein at least one of said player tracking devices grants paying for retail purchases to the specific player upon receipt of the information;

at least one computer server having a player verification program that verifies whether obtained information regarding said specific player is adequate according to one or more set criteria for verifying a player, wherein said at least one computer server denies initiation or continuation of a particular gaming event when said player verification program determines that any obtained information is unacceptable or when insufficient information has been obtained;

a communication link or path between said the one or more player tracking devices and said at least one computer server; and at least one database in communication with said at least one computer server, said at least one database containing specific informational data with respect to a plurality of players.

2. The gaming player verification system of claim 1, wherein said at least one of said one or more communication objects further comprises an object selected from a necklace, a collar, a wrist bracelet, a wristwatch, a belt, and an ankle bracelet, and wherein said player verification program verifies multiple submissions of information regarding said specific player during progress of or between one or more gaming events.

3. The gaming player verification system of claim 1, further comprising a marketing program that determines an amount of time that the at least one of said one or more communication objects is worn and an amount wagered during the amount of time, and determine a payment amount due from a sponsor based on the amount of time and amount wagered.

4. A method of providing automated player verification within a gaming environment, the method comprising:

providing one or more gaming events at a first gaming location within said gaming environment, wherein at least one of said one or more gaming events involves placement of a wager, presentation of a game, and grant of a monetary award based upon an outcome of the game;

receiving a request by a player at said first gaming location to participate in at least one particular gaming event selected from said one or more gaming events;

obtaining information regarding said player from a communication object worn by said player, said communication object comprises an RFID tag, a pressure sensor or a moisture detector, and an associated closed electrical circuit;

verifying that said information regarding said player is acceptable according to one or more set criteria; determining that said player is eligible to pay at a retail establishment based on said information; permitting said player to purchase retail purchases at said retail establishment; and permitting said at least one particular gaming event to commence or continue;

determining an amount of time said player wears the communication object and an amount wagered by the player during the amount of time; and charging a sponsor based on the amount of time and the amount wagered.

5. The method of claim 4, wherein at least a portion of said information regarding said player becomes unacceptable according to at least one set criterion when said communication object is no longer worn by said player.

6. The method of claim 4, wherein said communication object communicates via radio frequency waves.

7. The method of claim 4, wherein said communication object comprises an object selected from a necklace, a collar, a wrist bracelet, a wristwatch, a belt, and an ankle bracelet.

8. The method of claim 4, wherein said communication object further comprises a closed electrical circuit associated with said RFID tag and further including: detecting a break in said closed electrical circuit; and denying one of said one or more gaming events to commence or continue.

9. The method of claim 4, further including: determining whether said player is authorized to participate in said at least one particular gaming event.

10. The method of claim 4, further including subsequently repeated: obtaining information regarding said player from a communication object worn by said player; verifying that said information regarding said player is acceptable according to one or more set criteria; and permitting said at least one particular gaming event to commence or continue.

11. The method of claim 10, wherein said subsequently repeated is performed (1) continuously, (2) at regular periodic intervals, or (3) at random intervals.

12. An apparatus comprising:

at least one processor configured to control:

receiving, from at least one wearable communication object, information regarding a player, wherein the at least one wearable communication object includes an RFID tag, a pressure sensor or a moisture sensor and alters a communication pattern thereof in response to a change of an input level at the pressure sensor or the moisture sensor indicative of removal from the player, and in which the at least one wearable communication object is for use in conjunction with a computing device that accepts wagers and presents gaming events;

verifying whether the information regarding said player is adequate according to at least one criteria for verifying the player;

denying initiation or continuation of a particular gaming event when a determination, from the information, is the information is unacceptable or insufficient information has been obtained;

determining an amount of time that the at least one wearable communication object is worn by the player and an amount wagered during the amount of time; and determining a payment amount based on the amount of time and amount wagered.

13. The apparatus of claim 12, wherein said at least one wearable communication object further comprises an object selected from a necklace, a collar, a wrist bracelet, a wristwatch, a belt, and an ankle bracelet.

14. The apparatus of claim 12, wherein at least a portion of said information regarding said player becomes unacceptable according to at least one set criterion when said at least one wearable communication object is no longer worn by said player.

15. The apparatus of claim 12, wherein said at least one wearable communication object communicates via radio frequency waves.

16. The apparatus of claim 12, wherein said at least one wearable communication object comprises an object selected from a necklace, a collar, a wrist bracelet, a wristwatch, a belt, and an ankle bracelet.

17. The apparatus of claim 12, wherein said at least one processor is further configured to determine whether said player is authorized to participate in said particular gaming event.

18. The apparatus of claim 12, wherein said at least one processor is further configured to obtain information regarding said player from a communication object worn by said player; verify that said information regarding said player is acceptable according to one or more set criteria; and permit said particular gaming event to commence or continue.

* * * * *